United States Patent
Buckley

(10) Patent No.: US 8,101,115 B2
(45) Date of Patent: Jan. 24, 2012

(54) METHOD FOR MAKING THREE-DIMENSIONAL PREFORMS WITH CUT FIBERS USING ELECTROLUMINESCENT DEVICES

(75) Inventor: Daniel T Buckley, Shrewsbury, VT (US)

(73) Assignee: American GFM Corporation, Chesapeake, VA (US)

( * ) Notice: Subject to any disclaimer, the term of this patent is extended or adjusted under 35 U.S.C. 154(b) by 0 days.

(21) Appl. No.: 13/096,785

(22) Filed: Apr. 28, 2011

(65) Prior Publication Data
US 2011/0198025 A1    Aug. 18, 2011

Related U.S. Application Data

(62) Division of application No. 11/403,327, filed on Apr. 13, 2006, now Pat. No. 7,955,548.

(51) Int. Cl.
B29C 35/08    (2006.01)
(52) U.S. Cl. ........................................ 264/496; 425/174
(58) Field of Classification Search .................. 264/496; 425/174; 156/275.5, 273.7
See application file for complete search history.

(56) References Cited

U.S. PATENT DOCUMENTS

| 5,217,654 | A | | 6/1993 | Buckley |
| 5,338,169 | A | * | 8/1994 | Buckley ........................ 425/82.1 |
| 5,364,258 | A | | 11/1994 | Buckley et al. |
| 5,539,012 | A | | 7/1996 | Klemarczyk et al. |
| 5,866,060 | A | | 2/1999 | Buckley |
| 6,001,300 | A | | 12/1999 | Buckley |
| 6,004,123 | A | * | 12/1999 | Buckley et al. ............ 425/174.4 |
| 2003/0044114 | A1 | | 3/2003 | Pelka |

FOREIGN PATENT DOCUMENTS

| JP | 10067865 A | 3/1998 |
| WO | WO2005094271 | 10/2005 |

OTHER PUBLICATIONS

EviDot Quantum Dot Composite Resins website, Evident Technologies, version available Feb. 7, 2005.
Black, S., Technologies for UV curing of composites laminates demonstrated, http://www.compositesworld.com/articles/technologies-for-uv-curing-of-composite-laminates-demonstrated.aspx, (Apr. 1, 2004), pp. 1-6.

* cited by examiner

Primary Examiner — Christina Johnson
Assistant Examiner — Galen Hauth
(74) Attorney, Agent, or Firm — Greer, Burns & Crain, Ltd.

(57) ABSTRACT

The present invention relates to methods of making preforms, fiber-reinforced molded articles and fiber mats, wherein the methods use electroluminescent devices such as LED's and/or quantum dots located on a surface of the mold.

18 Claims, 13 Drawing Sheets

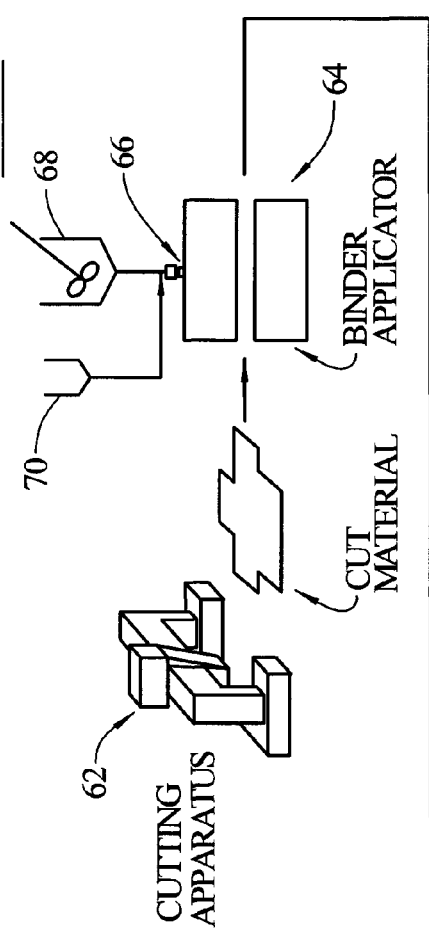
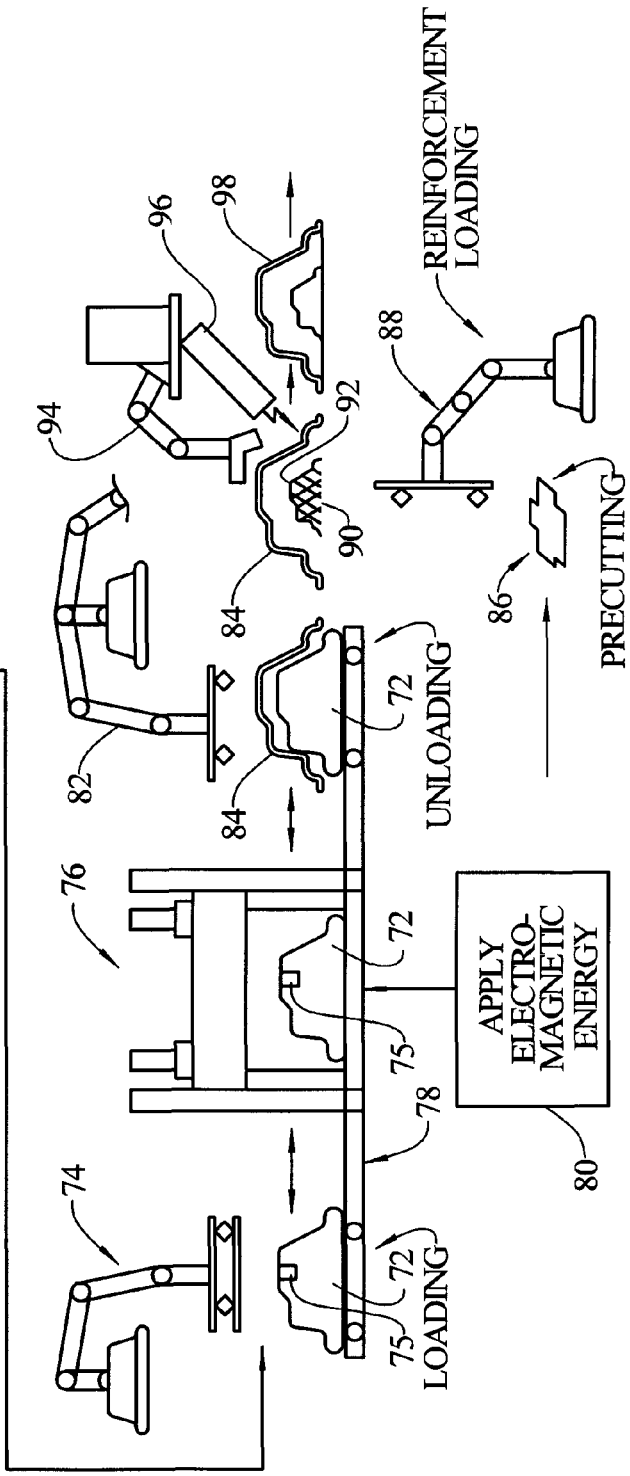
FIG. 2

METHOD FOR MAKING THREE-DIMENSIONAL PREFORMS WITH CUT FIBERS USING ELECTROLUMINESCENT DEVICES

This is a divisional of application Ser. No. 11/403,327, filed Apr. 13, 2006.

INTRODUCTION

The present invention is related to a method and to an apparatus for making structural reinforcement preforms for various liquid composites processes such as resin transfer molding (RTM) and reaction injection molding (SRIM) processes for structural composites wherein a resin matrix as a deformable plastic material is filled into the interstices between the fibers of the formed structural reinforcement preforms when the preforms and plastic material are molded in a mold to form a structural composite comprising the plastic with the fibers contained therewithin as reinforcement.

The present invention is further related to the handling of reinforcement webs used in the process and in attaching reinforcement members and the like as a part or parts of the preforms.

The present invention additionally relates to electromagnetic energy curable binders, mat making and preforming processes, and to apparatuses for carrying out the processes, for curing binders on non-woven reinforcing materials and combinations thereof during their manufacture, and is more particularly concerned with the use of electromagnetic energy generated by electroluminescent devices.

In making directed fiber preforms, it has heretofore been the practice to spray chopped fibers with a thermally-curable or thermally meltable binder resin onto a form that has air pulled therethrough to locate and hold the fibers. The form with the fibers and the binder resin is then heated or heated and cooled, rotated into a hot air plenum chamber, dried/cooled or cured to set the binder resin. This thermal curing process requires a great deal of energy, time and storage space for drying and curing the preforms. Improved methods based on the use of electromagnetic radiation-curable binders ("light-curable binders") have been developed in U.S. Pat. Nos. 6,001,300, 6,004,123 and 5,866,060 (herein incorporated by reference). Such techniques allow for more energy and time-efficient production of preforms by using the radiation-curable binders. Such binders are cured by applying directed energy, for instance ultraviolet or microwave radiation, thus dispensing with the need for large, continuously operating ovens for curing the binder.

Such techniques however may suffer from the type of electromagnetic energy source ("light source") employed. In particular, the use of conventional light sources such incandescent light bulbs can suffer from a loss of power that is a function of the distance between the binder to be cured and the light source itself. Also, conventional electromagnetic energy sources such as light bulbs usually emit in a wide wavelength spectrum, thus limiting the possibility of selectively curing binders in binder mixtures comprising two or more initiators each sensitive to particular electromagnetic energy wavelengths.

SUMMARY

In some embodiments, the present invention provides a method of making fiber-reinforced molded articles, comprising: adding a composition comprising an electromagnetic energy-curing binder to a reinforcing material comprising fibers; applying the reinforcing material to a preform mold surface which has a configuration corresponding to at least a portion of a molded article; and exposing said binder to electromagnetic radiation produced by one or more electroluminescent devices such as a light emitting diode (hereinafter "LED"). The electromagnetic energy-curable binder may also be added to the reinforcing material after the material has been applied to the mold.

In some additional embodiments, the present invention provides a method of making fiber-reinforced molded articles, comprising: applying a layer on a preform mold surface which has a configuration corresponding to at least a portion of a molded article, wherein said layer comprises reinforcing fibers and a binder composition, and wherein said binder composition comprises an anaerobic binder component and a electromagnetic radiation-curable binder component; exposing said binder composition to an atmosphere that promotes the curing of the anaerobic binder, wherein said atmosphere may for instance be vacuum or one or more inert gases, or a combination thereof; and exposing said binder composition to electromagnetic radiation that promotes the curing of the electromagnetic radiation curable-binder, wherein said electromagnetic radiation is produced by an electroluminescent device such as an LED.

In some further embodiments, the present invention provides a method of making fiber-reinforced molded articles, comprising: applying a layer of material comprising reinforcing fibers and a binder composition on a preform mold surface which has a configuration corresponding to at least a portion of a molded article, an electromagnetic radiation-curable component, optionally an anaerobic component and optionally a heat-curable component; optionally exposing said binder composition to electromagnetic radiation that promotes the curing of the electromagnetic radiation-curable binder, wherein said electromagnetic radiation is produced by one or more electroluminescent devices such as LED's; optionally contacting said binder composition with an atmosphere that promotes the curing of the anaerobic binder component and optionally heating said binder composition to a temperature promoting the curing of the heat-curable binder. The above curings of the binder components may occur in any order.

More embodiments of the invention provide a method of manufacturing a preform, comprising the steps of: moving a plurality of webs of fibrous reinforcing material along respective paths and guiding the webs superposed such that they superpose parallel to one another at a predetermined location and travel parallel to and in contact with one another; applying a binder comprising an electromagnetic radiation-curable component to at least one surface of each pair of facing surfaces of the webs upstream of the predetermined location, or separately applying an electromagnetic radiation-curable binder and an anaerobic binder to at least one surface of each pair of facing surfaces of the webs upstream of the predetermined location; locally applying electromagnetic radiation into selected spaced locations of the parallel contacting webs to cure the electromagnetic radiation-curable binder at the spaced locations and thereby tack the webs together, wherein said electromagnetic radiation is produced by one or more electroluminescent devices such as LED's; cutting a blank from the tacked webs; forming the blank in a three-dimensional shape corresponding to at least a portion of the preform; and contacting the blank with electromagnetic radiation optionally produced by one or more electroluminescent devices such as LED's.

In some additional embodiments, the present invention provides a method for making a rigid three-dimensional structural preform using a separable mold including a first mold part and a pressing second mold part, the mold parts, when closed, together defining a desired three-dimensional shape of the preform and including inner surfaces disposed at angles with respect to one another forming inside and outside corners, comprising the steps of cutting fibers of reinforcement material; applying the cut fibers onto the first mold part to a predetermined thickness; applying an electromagnetic energy-curable binder onto the cut fibers to at least partially coat the fibers with the binder, optionally without filling interstices among the fibers; closing the separable mold parts to press the binder-coated cut fibers into the desired three-dimensional shape of the preform between the pressing second mold part and the perforate first mold part of the closed mold; and applying electromagnetic radiation to the electromagnetic energy-curable binder, wherein said electromagnetic radiation is produced by one or more electroluminescent devices such as LED's.

In all of the above embodiments, the electromagnetic energy can also be produced by one or more quantum dots. The quantum dots can be part of one or more LED's incorporating quantum dots (also known as quantum light emitting diodes, or "QLED's"). Alternatively, the quantum dots can also be made to produce electromagnetic radiation by irradiation with electromagnetic energy of the appropriate wavelengths.

The quantum dots can also be made to produce electromagnetic energy by running an electric current therein. Accordingly, quantum dots can be applied on a tooling surface and produce electromagnetic energy when an electric current is applied. Also, quantum dots can be incorporated in binder formulations or put into contact with conductive fibers, thereby promoting curing of the binder when an electric current is applied.

These and other features of the present teachings are set forth herein.

BRIEF DESCRIPTION OF THE DRAWINGS

The skilled artisan will understand that the drawings, described below, are for illustration purposes only. The drawings are not intended to limit the scope of the invention in any way.

FIG. 2 illustrates a process using robots for handling the material between processing stations.

DESCRIPTION OF VARIOUS EMBODIMENTS

Figure 1:
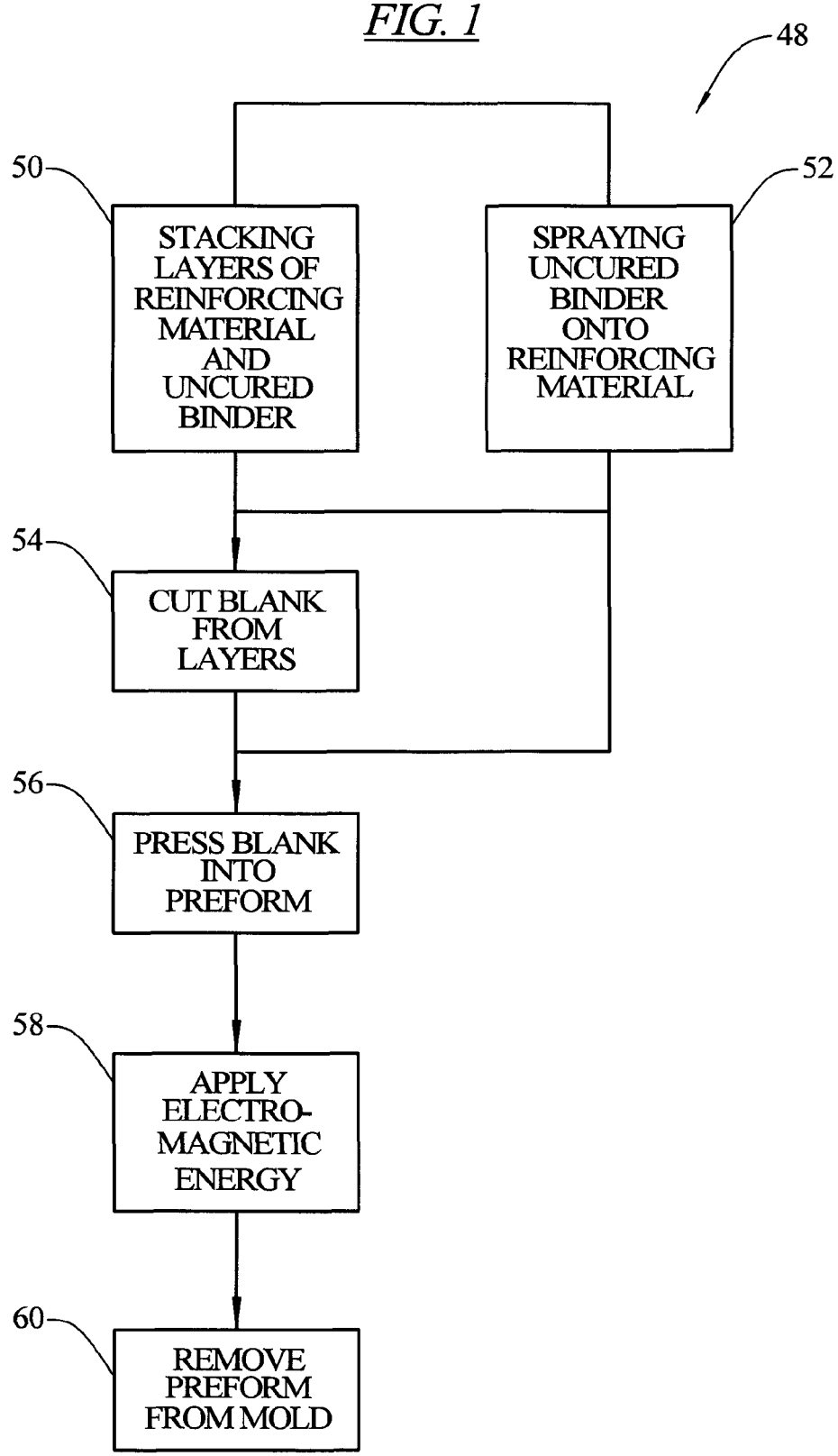
FIG. 1 illustrates the flow chart of a typical process for practicing some embodiments of the invention.

The present teachings provide new methods for manufacturing preforms, wherein the binder resin comprises a light-curable binder and the light source comprises an electroluminescent device such as a light-emitting diode ("LED") or a phosphor. An electroluminenscent device emits electromagnetic energy by means of electroluminescence.

Electroluminescence is the result of radiative recombination of electrons and holes in a material (usually a semiconductor). The excited electrons release their energy as photons—light. Prior to recombination, electrons and holes are separated either as a result of doping of the material to form a p-n junction (in semiconductor electroluminescent devices such as LED's), or through excitation by impact of high-energy electrons accelerated by a strong electric field (as with the phosphors in electroluminescent displays).

Representative example electroluminescent devices are LED's incorporating quantum dots (also known as quantum light emitting diodes, or "QLED's"); such QLED's can emit electromagnetic radiation in narrow or broad bands according to the application at hand (Bowers et al., Journal of the American Chemical Society, 2005, Vol. 127, pages 15378-15379 and the references cited therein, incorporated herein by reference). Alternatively, quantum dots can also produce electromagnetic energy when irradiated with a second electromagnetic energy of the appropriate wavelength.

Quantum dots can also be produce electromagnetic energy when subjected to an electric current. Accordingly, they can be made to produce electromagnetic energy if put into contact with conductors such as carbon fibers. The curing of electromagnetic energy curing binders can therefore be induced by running an electric current through a material comprising conductive fibers such as carbon fibers.

Phosphors such as electroluminescent polymers ("polymer phosphors") constitute another representative such example.

The methods and binders of the invention can be applied to preforms and preforming methods used in any liquid composite process such as RTM and RIM resin systems, e.g. polyesters, vinyl esters, urethanes, epoxies, phenolics and acrylates.

For example, a preform can now be produced with LED's emitting in selected portions of the spectrum that are mounted on or near the surface of the forming tools for exposure from one or two sides of the reinforcing material. This provides the benefit of improving the capability to cure very deep sections or areas that are hard to reach with conventional light sources. Also, this has the further benefit of locating the light source at a close distance from the reinforcing material, thereby not suffering from the loss of power that is associated with the distance of conventional electromagnetic energy sources from the reinforcing material.

The process of the present invention utilizes electromagnetic energy generated by electroluminescent devices such as LED's for rigidizing the composite preform. Structural components may be added to the preforms through energetic stitching techniques, wherein the energy applied to carry out the stitching may also be generated by electroluminescent devices such as LED's. Energetic stitching is made easier through a selection of where the electroluminescent devices will be placed in the forming tools, and the process may be further simplified by locating the electroluminescent devices only in the area where the stitching will take place.

Energetic stitching may also take place through selective curing by not activating selected LED's during prior steps of preform manufacturing and then turning on the selected LED's during the energetic stitching. This eliminates the need for blocking light from reaching the area where the energetic stitching will take place. Light blocking and not activating selected LED's may also be combined when desired.

The process of the present invention is designed to be fully automated and to enable specific distribution and placement of numerous types of reinforcements, where necessary, for the required structural properties of a preform. Complete freedom of design is therefore inherent in the process and allows for the most desirable reinforcement type and/or structures including closed structural shapes and varied wall sections to meet design criteria. The process of rigidizing and/or attaching component structures can be incremented and tailored to the cycle time of the molding machine or supply a variety or plurality of the preforms to more than one molding machine.

Automation of the process is designed to make full use of statistical processing techniques to produce preforms of repeatable, consistent quality and structural integrity. Application of the process technology can be integrated into a wide variety of product areas such as transportation, marine, aircraft, aerospace, defense and sporting, and in consumer goods.

As will be set forth in detail below, polymer resin chemistry along with electroluminescent devices are used in conjunction with specially designed automation machines for the manufacturing of structural carrier preforms. The preforms can be tailored for specific structural and size requirements necessary for liquid composite molding processes and components.

Various reinforcement materials may be added to conform to any complex shape desired. According to a feature of the invention, the utilization of other reinforcement materials can be consolidated with the preform structure by addition of stiffeners or ribbing and encapsulation of core materials along with inserts can be achieved where reinforcement for structural as well as class A applications are required.

In practicing the invention, mats or fabrics (or combinations thereof, collectively referred to as materials) of fiber-containing reinforcement material are optionally precut to conforming shapes as blanks, a binder comprising an electromagnetic energy-curable component is applied and each blank is then transferred into a specifically engineered mold set that replicates the shape of a part. Electromagnetic energy promoting the curing of the binder is applied, in turn rigidizing the preform. The electromagnetic energy is generated by electroluminescent devices, for instance LED arrays set up in a tunnel for either full exposure or scanning or LED arrays built into the surface of the forming tooling or within secondary LED array curing skins or tools. The mold sets are opened and the preform is transferred to a molding station or to an optional energetic stitching station or to a net shape cutting station.

The preformable materials are cut into predetermined patterns that allow it to conform to the contours of the forming mold. The binder resin is applied to either side or both sides of the preformable material. Single or multiple layers of materials are sandwiched together to create the carrier preform. Carrier preform is a term coined by the C.A. Lawton Company in U.S. Pat. No. 6,001,300 (herein incorporated by reference) to describe a preform in a process that will be used as a subassembly or have more material subsequently attached thereto by energetic stitching to create the final assembly. Energetic stitching is a term coined by the C.A. Lawton Company to describe the method of placing and attaching structures to a basic preform. The binder is metered into the applicator system. The binder generally includes one or more resins, one or more monomers, one or more hydroperoxides, one or more initiators and one or more inhibitors. An example binder includes 15% to 55% by weight of a resin such as epoxymethacrylate and 45% to 85% by weight of monomers such as methacrylate monomers, polyhydric alcohols and ester alcohols. From 0% to 30% of the monomers are made up of combinations of one or more of the following depending on performance and compatibility requirements: alkyl hydroxyls (mono, di and tri functional), beta carboxy ethyl acrylate, methacrylic acid, acrylic acid (dimer, trimer and higher analogs), hydroxy ethyl methacrylate, hydroxy propyl methacrylate, hydroxy ethyl acrylate, hydroxy propyl acrylate and hydroxy butyl acrylate. The hydroxyl functionality provides residual functionality for compatibility with epoxies, vinyl esters and urethanes while the acid groups provide residual functionality for epoxies, polyesters and phenolics. The hydroperoxides may constitute 0% to 5% of the total weight of the composition and the accelerators may constitute 0% to 4% by weight of the composition.

In applying the binder, the binder resin can be sprayed, rolled or calendared as a film to coat the fibers of the material, optionally without filling the interstices among the fibers. The viscosity of the binder can be modified as necessary by application to penetrate to varying degrees to provide various levels of preform stiffness or not to penetrates and to stay on the surface and provide adhesion between the various layers of the preform. After application of a binder, the reinforcement material is mechanically loaded onto the forming mold.

The mold is shuttled into a forming press and the forming press closes to form the reinforcement material into the desired shape. Alternatively, the mold may be mounted directly in a forming station with no need for shuttle action. While closed, electromagnetic energy produced by one or more electroluminescent devices, such as LED's or quantum dots, is applied, therefore curing the catalyzed binder resin. In addition, when there is a conductive material present, and an electric current is applied, quantum dots incorporated in the binder and/or electrically connected to the conductive material can produce electromagnetic energy at the appropriate wavelengths to cure the binder.

The binder resin, in curing polymerizes to a rigid form allowing the preform to retain the shape of the forming mold. Additional sections can be added where needed and rigidized into place by chemical stitching techniques, herein also referred to as the above-mentioned energetic stitching.

Conventional preforming processes are presently being improved with automation, but generally continue to be operator dependent. The present invention is designed for a turnkey industrial manufacturing process with a high level of automation. With the use of automation/robotics, the fiber distribution becomes highly uniform and repeatedly consistent, making all aspects of the process statistically controllable.

After the rigidizing cycle, the forming press is opened and the preform is removed or the mold shuttled out where the carrier preform is mechanically unloaded and transferred to other processing locations for insert applications or molding. In conventional RTM/SRIM molding process applications for structural components, fiber layer thickness is adjusted to withstand strength requirements. The energetic stitching process allows for adding reinforcement materials selectively and specifically into high stress areas without increasing overall thickness and weight. Applications of inserts, closed sections and/or cores to the carrier preform can be processed with the use of energetic stitching techniques, wherein the electromagnetic energy to carry out the energetic stitching may be produced by electroluminescent devices such as LED's. Precut sections of reinforcement materials can be energetically stitched into place using secondary electromagnetic energy applicators, wherein said secondary electromagnetic energy applicators may be electroluminescent devices such as LED's. The carrier preform with the added reinforcement and binder can be shuttled back into the forming press or into a secondary clamping device that holds the material into place while energy is applied.

The finished preform can be transferred to a holding area or directly to the molding operation. Since rigidizing of the preform is typically faster than the molding cycle, various forming molds can also be set up in the rigidizing process, thus allowing for numerous preform shapes to be made to supply other molding stations.

Multiple plies of reinforcement material can be formed into desired shapes simultaneously. Other types of reinforcement materials may be encapsulated for stiffening, ribbing and attaching components using the energetic stitching process. These types of reinforcement materials, fibrous, metallic and/or light-weight structural foams and low density cores can be added at the onset of the loading and shaping process as part of the carrier preform or as a secondary operation where placement of insert materials are necessary for the preform structure.

When using the material in conjunction with unidirectional fabrics or other reinforcements in specific locations, optimum reinforcement structures of high fiber content can be attained while maintaining a rigid form for easily handling and permeation of resin systems into the interstices among the fibers of the material during molding operations. Placement of reinforcements into specific locations allows fiber orientation where needed to obtain required strengths of the molded product.

The process is illustrated by the example flow chart of FIG. 1, a typical process for practicing some embodiments of the invention is illustrated at 48 as comprising a step 50 of stacking layers of reinforcing material and uncured binder in which the layers are formed by applying binder to the reinforcement material or, in the alternative, the step 52 of spraying uncured binder onto a reinforcement material to be preformed to a degree sufficient to coat the fibers of the mat optionally without filling the interstices among the fibers. Alternatively, steps 48 and 52 may be combined, thereby stacking layers of material mixed with binder. Next, blanks are cut at 54 to conform to the shape of a planar development of the preform. Alternatively, the blanks are not subjected to cutting at 54, going directly to 56 instead. At 56, the blank is pressed in the mold into the shape of the preform and electromagnetic energy produced by electroluminescent devices such as LED's is applied at 58 to cause curing of the binder. At 60, the binder is cured and rigid, and the rigidized preform may be removed from the mold.

FIG. 2 illustrates a similar process using robots for handling the material between processing stations. In FIG. 2, the first step is to precut a reinforcement material to conform to the developed shape of a preform, as indicated by cutting apparatus 62. This is a version of the process set forth in FIG. 1. After the material is cut at 62, a binder is added at 64 in a binder applicator 66 which comprises a source of binder resin 68 the binder can be single component or two component and one component a source of a catalytic promoter 70. As mentioned above, the binder may be applied in the binder applicator 66 by spraying, rolling or calendaring to a degree sufficient to coat the fibers of the mat optionally without filling the interstices among the fibers. Next, the composite blank of reinforcement material and binder is transferred from the binder applicator to a mold 72 by a robot 74. The mold 72 may be of the type illustrated in FIG. 2 such that the composite blank is positioned on the preforming mold. The mold may comprise one or more electroluminescent devices such as LED's 75. The mold 72 is then moved along a shuttle 78 to a press 76 where the two halves of the mold are pressed to replicate the desired shape of the preform and electromagnetic energy is applied from one more electroluminescent devices such as LED's 80 and/or LED's 75. Optionally, the binder may also include an additional anaerobic or thermal cure component, and 80 may also comprise a vacuum source, an inert gas source or a thermal cure source, whereby a thermal cure source is a heat source such as a hot air source or one or more heat-generating LED's, in order to cure this additional component.

Next, the mold 72 is unloaded by moving the same along the shuttle 78 to a position where a robot 82 unloads the cured preform 84. Here, the preform becomes a carrier preform in that reinforcement is to be added in the form of a reinforcing structure. The robot 82 will then stack the preform for short term storage or move it directly into the energetic stitching process.

When elements are to be stitched to the carrier preform, the reinforcement material is precut, as before, at 86 and a robot 88 positions the precut material over a form 90 so that it takes a reinforcement shape 92. A robot 94 then retrieves a preform 84, now a carrier preform, and places the same over the formed element 92. There will be points, not shown, that the carrier preform 84 and the formed element 92 engage in intimate contact. When the energetic stitching process utilizes electromagnetic energy, for instance electromagnetic energy produced by electroluminescent devices such as LED's, the element 92 comprises a binder resin sensitive to electromagnetic energy. The stitching process utilizes materials with a binder of choice selected to cure by the method of choice, for instance electromagnetic radiation, heat or anaerobic curing, is applied at specific spot locations where the elements 84 and 92 are in intimate engagement. The energy appropriate to cure the binder of choice, for instance electromagnetic radiation such as infrared radiation, visible light or ultraviolet radiation, is applied locally, for instance with one or more LED's 96; alternatively, the stitching may be accomplished by masking the areas where the binder is to be left uncured thereby curing the unmasked areas. Also, the stitching may be accomplished by applying electromagnetic energy to areas where electromagnetic energy was not previously applied by electroluminescent devices 80.

In either case, a reinforced structure 98 is produced. The structure 98 is then transferred to a molding process for molding of the finished structure.

In other embodiments, the present teachings also provide new methods for making preforms with "energetic basting" techniques, developed in U.S. Pat. Nos. 5,217,656; 5,364,258; 5,827,392 and 5,487,853, whereby a rigid three-dimensional preform is made by moving a plurality of webs of fibrous reinforcement material superposed and coplanar to a cutter, the webs being coated with an electromagnetic energy-curable binder and optionally an anaerobic binder, or with a two-stage binder comprising an electromagnetic energy-curable component and an anaerobic component, and pressed together. Prior to cutting a blank in a two-dimensional development of the three-dimensional preform from the webs, the webs are tacked together at spaced local zones in an "energetic basting" step by locally curing the binder at those zones by locally applying electromagnetic energy produced by electroluminescent devices such as LED's so that the webs travel as one to the cutter. After the basted blank is formed in the three-dimensional shape of the desired preform, the second cure stage may be an electromagnetic energy cure, where the electromagnetic energy may be produced by electroluminescent devices such as LED's. When an anaerobic binder is present, an anaerobic cure that will be initiated via the application of an atmosphere may promote the curing of the anaerobic component.

After preforming, the rigidized three-dimensional preform is removed from the mold and manipulated by robotic devices as a carrier preform for the possible attachment of reinforcement members. In this part of the process, the carrier preform is oriented to a desired position, a binder appropriate to the desired curing mechanism is applied to the surface area or areas thereof, a reinforcement rib or the like is moved into intimate contact with the area or areas with the binder and the sprayed area or areas and the binder is cured with the appropriate mechanism, for instance by electromagnetic energy produced by electroluminescent devices such as LED's. The cured binder resin bonds the reinforcement member to the carrier preform. This attaching of reinforcement members, termed stitching, may take place several times to provide reinforcement ribs inside the three-dimensional shape, outside the three dimensional shape on the outer surface thereof and/or to add a cover which closes a hollow three-dimensional structure. After the final reinforcement member is attached, the preform may be stored or moved to a molding station of a liquid composite molding process. Preforms may also be manufactured with commingled materials such as TWINTEX® (Saint-Gobain Vetrotex, Shelby, Mich.) a commingled material comprising glass fibers and polypropylene fibers, and CURV® (Propex Fabrics, Gronau, Germany) a polypropylene/polypropylene commingled material. In such materials, the matrix resin is in the form of a thermoplastic fiber co-mingled with the reinforcing fibers. In application, the co-mingled material is heated up and the resin flows around the fibers thus producing a thermoplastic composite. If the co-mingled material is preconsolidated, the high viscosity of the resin dramatically reduces the conformability of the material into any complex shape. As a result, it is desirable to preform and rigidize the material so that the heating of the resin takes place on an already shaped part which is then consolidated without having to move the fibers greatly. In this case the thermoset binder is not affected during the heating and melting of the matrix resin and generally holds the preform in shape if the right amount of binder is used.

Figure 3:
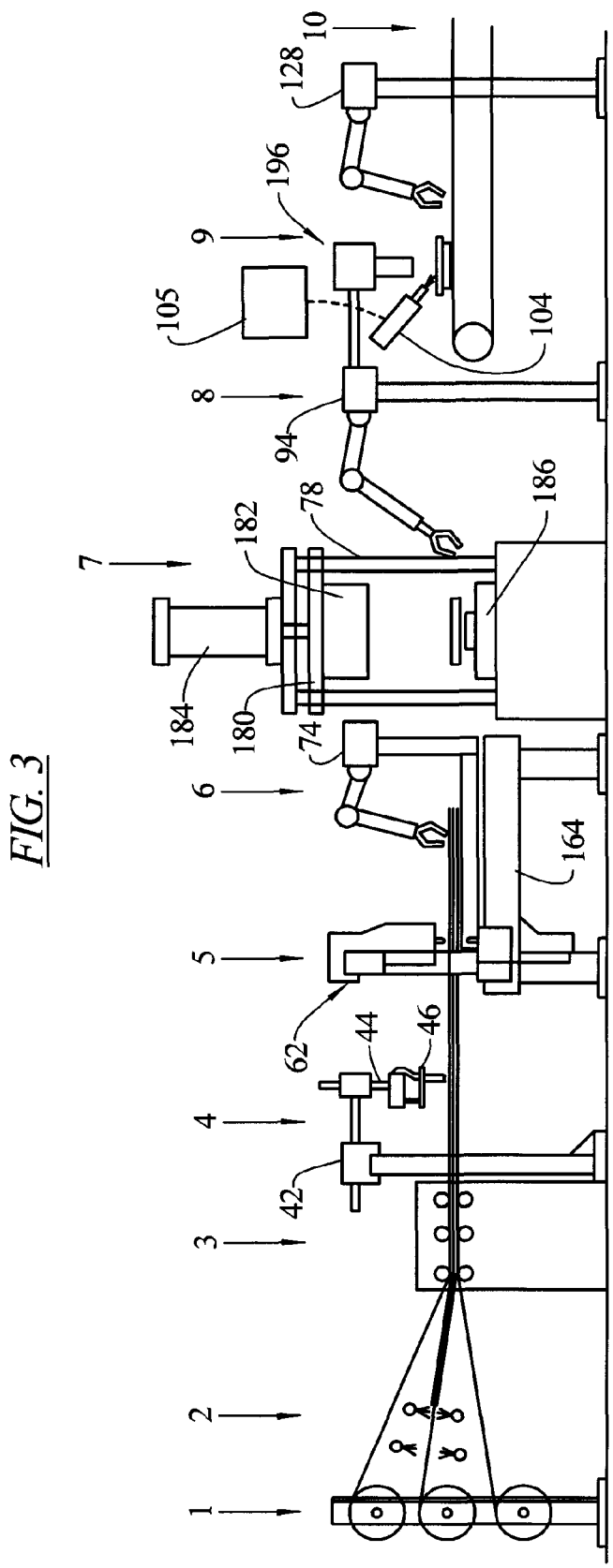
FIG. 3 illustrates a process for making rigid three-dimensional preforms with the energetic basting techniques.

A process for making rigid three-dimensional preforms with the energetic basting techniques according to the invention is illustrated in FIG. 3 as comprising a plurality of process stations or stages 1-10.

At the supply stage 1, a plurality of rolls of reinforcement material, such as glass fiber continuous strand, woven fabric or the like is mounted for dispensing a like plurality of webs of the material superposed with respect to one another toward a compaction stage 3 where the webs are received, guided and directed coplanar with respect to one another.

Between the supply stage 1 and the compaction stage 3 is a binder application stage 2 in which a binder is applied. Said binder can be a two-stage binder comprising, for instance, a first electromagnetic energy-curable component that cures when exposed to electromagnetic energetic of a first set of one or more wavelengths and a second electromagnetic energy-curable component that cures when exposed to electromagnetic energy of a second set of one or more wavelengths. Said two-stage binder is applied to at least one surface of each pair of facing surfaces of the webs. Here, the binder(s) may be applied to the upper and lower surfaces of the middle web, but may also be applied to the lower surface of the upper web and the upper surface of the lower web or to all of the facing surfaces.

In the pressing or compaction stage 3, the webs are pressed together causing spreading of the binders and permeation of the binders into greater contact areas with the fibers of the webs.

The superposed webs are then fed to an energetic basting station 4 where they are basted together, for example by electromagnetic energy generated by electroluminescent devices such as LED's, at locations spaced longitudinally and/or transversely of the webs, for instance by curing the electromagnetic energy-curable binder. These spaced locations, as will hereinafter be described, are also considered to be basting zones in that they are three-dimensional and extend to and bind all of the webs.

The webs, basted together form essentially a single element, are then moved to a near net shape or net shape pattern cutting stage 5 in which a two-dimensional planar projection or planar development of the three-dimensional desired structure is cut from the web for later forming into the three-dimensional shape of the preform. The shaped material cut from the multilayer web is transferred to a mold stage 7 by way of a material pickup stage 6. At the mold stage 7, the shaped material is positioned between separable parts of a mold which is then closed causing the shaped material to assume the contours of the three-dimensional preform. At the mold stage 7 and while still in the mold, the shaped material is subjected to electromagnetic radiation, for example electromagnetic radiation produced by electroluminescent devices such as LED's, to promote the curing of the electromagnetic energy-curing binder.

If required, the shaped material may also be subjected to an atmosphere that promotes the curing of an anaerobic binder component. Upon curing, the shaped material becomes rigid and is transformed into a rigid three-dimensional preform. Upon opening of the mold, the preform may be removed from the mold stage 7 and transferred to stitching stage 9 by way of a material handling stage 8, that is, if the preform is to be considered a carrier preform for the attachment of reinforcement members or the like. If not, the material handling stage 8 may simply deposit the rigid three-dimensional preform on a conveyor 10 for discharge for storage or for transport to, for example, a resin transfer molding (RTM) process or a reaction injection (SRIM) molding process. If the preform is to assume the status of a carrier preform, the material handling stage 8 may operate in conjunction with the stitching stage 9 to manipulate the preform into positions as hereinafter described.

In the stitching stage 9, reinforcement members are attached to the carrier preform by spraying a binder, as indicated at 104 onto specified locations of the carrier preform and/or the subassembly, the reinforcement rib moved into a desired orientation and into intimate contact with the locations by a material handling device 128 and the locations subjected to stitching, via the stitching process appropriate to the binder, by way of a stitching device 96, wherein said stitching device may comprise one or more electroluminescent devices such as LED's.

There may be a plurality of the material handling devices 128, as needed, in order to handle and stitch a plurality of reinforcement members to the carrier preform.

As indicated on FIG. 3, the material handling stages may comprise a plurality of robots 74, 94, 128 and 105, of which the robot 105 for moving the spray device 104 is symbolically illustrated as connected thereto by mechanical linkage shown by broken lines. Inasmuch as robotics and robotic devices are well known in the art, a detailed explanation thereof is not considered necessary here.

It will be appreciated that the above-described process may be continuous and describes a stepped process cycle in which the processing stage with the longest processing time is the controlling stage. Inasmuch as shaping and rigidizing the preform is only a matter of seconds, it is assumed that for most processes, this is not the controlling stage. Depending on the number of reinforcement members added and the nature of the shape of the shaped material, either of these stages could be considered the controlling stage by which all other processing times and the timing thereof are determined and tailored to the following molding process.

Figure 4:
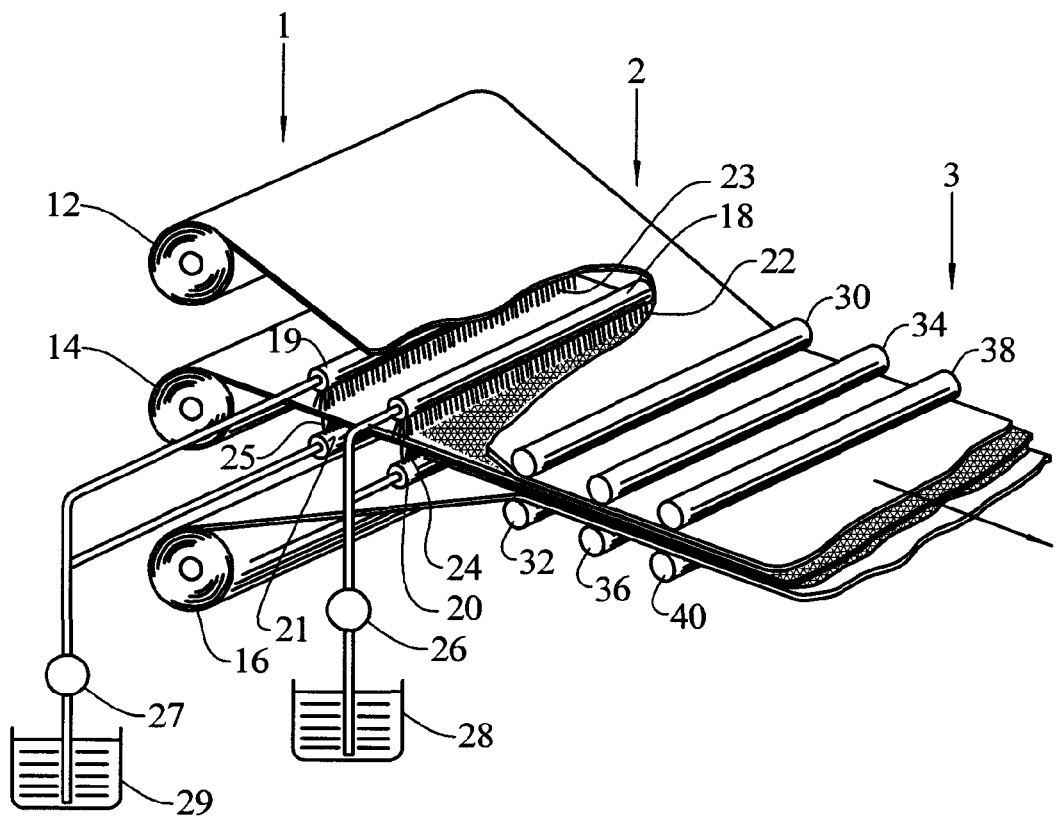
FIG. 4 illustrates a binder application stage and a binder compaction stage.

Referring to FIG. 4, a more detailed view of the supply stage 1, the binder application stage 2 and the compaction stage 3 is illustrated. The supply stage 1 is illustrated as comprising a plurality of rolls 12-16 of reinforcement material which are to be dispensed as individual webs in a superposed relation toward a predetermined location at the beginning of the compaction stage 3 at which the webs are aligned to travel coplanar with respect to one another. This is accomplished by a pair of opposed press rollers 30 and 32.

The binder resin spray applicator 2 is illustrated as comprising spray mechanisms 18, 19, 20 and 21 which are fed from reservoirs 28 and optionally 29 by way of pumps 26 and 27 to provide a mist or cloud 22, 23, 24 and 25 between the upper web 12 and the center web 14 and between the center web 14 and the lower web 16. In one configuration, reservoir 28 contains a first electromagnetic radiation-curable binder. The pump and applicator dispensing the binder may be set up in a way such that the binder may be applied specifically at selected spaced locations. The binder coats at least one of the facing surfaces of each pair of facing surfaces with binder resin.

Figure 5:
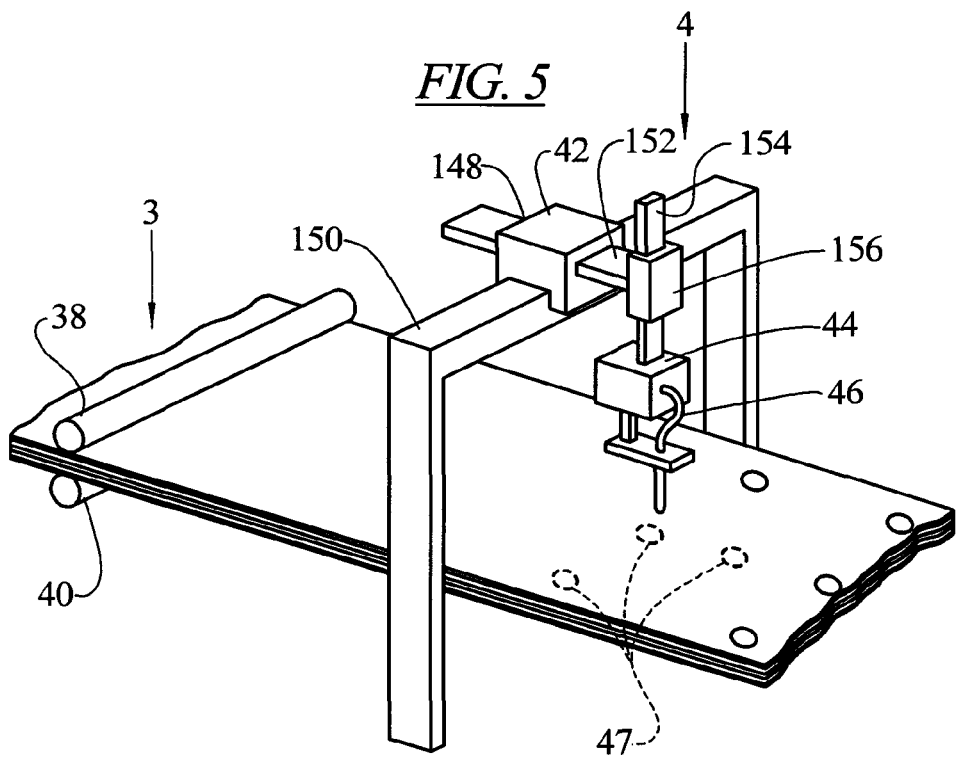
FIG. 5 illustrates an energetic basting station.

Referring to FIG. 5, the coplanar multilayer web structure is illustrated as exiting the compaction stage 3 between the press rollers 38 and 40 and entering the basting station 4. The basting station 4 comprises a gantry 42 including a member 148 which may be driven transversely above the webs on a beam 150, a member 152 which may be moved with respect to the member 148 in the direction of movement of the webs and opposite thereto, a member 156 carried in cantilever fashion at an end of the member 152 and a member 154 which may be driven perpendicular to the webs through the member 156, the member 154 supporting an electromagnetic energy source 44, for instance an electroluminescent device such as one or more LED's.

The source may be periodically activated or its emission may be periodically gated to provide curing at spaced zones in the desired locations of the webs. The driving and driven members may include rack and pinion type structures or linear motor type structures.

Figure 6:
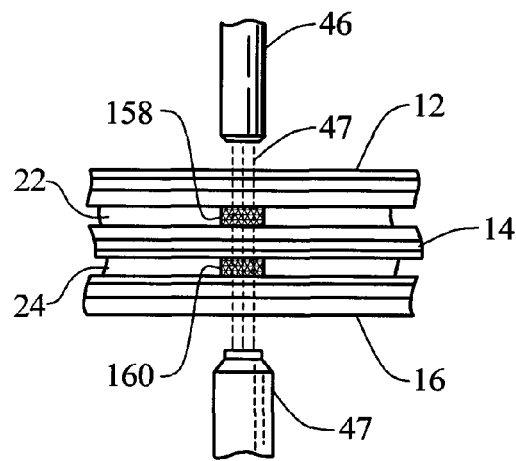
FIG. 6 illustrates LED's for curing binders.
Figure 7:
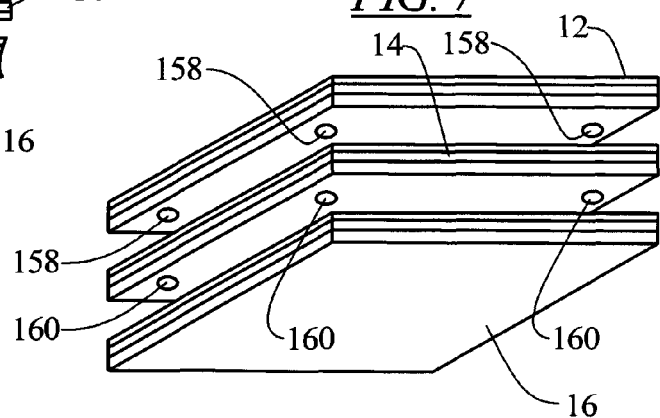
FIG. 7 illustrates a bound structure.

Turning to FIGS. 6 and 7, an electroluminescent electromagnetic energy source such as LED 46 and optionally LED 47 that cure the binder are illustrated in FIG. 6, curing the binder in respective zones 158 and 160 to bind the webs together. The same bound structure is illustrated in FIG. 7 with the zones 158 and 160 indicated as points of connection between the webs. Such zones can be either spots or stripe-shaped. The basting of a laminate schedule or segments of a laminate schedule can take place at the cutting table as part of the cutting process and would most commonly take place there so that the spot cures would hold the materials optimally with respect to the shape and subsequent forming operations.

Figure 8:
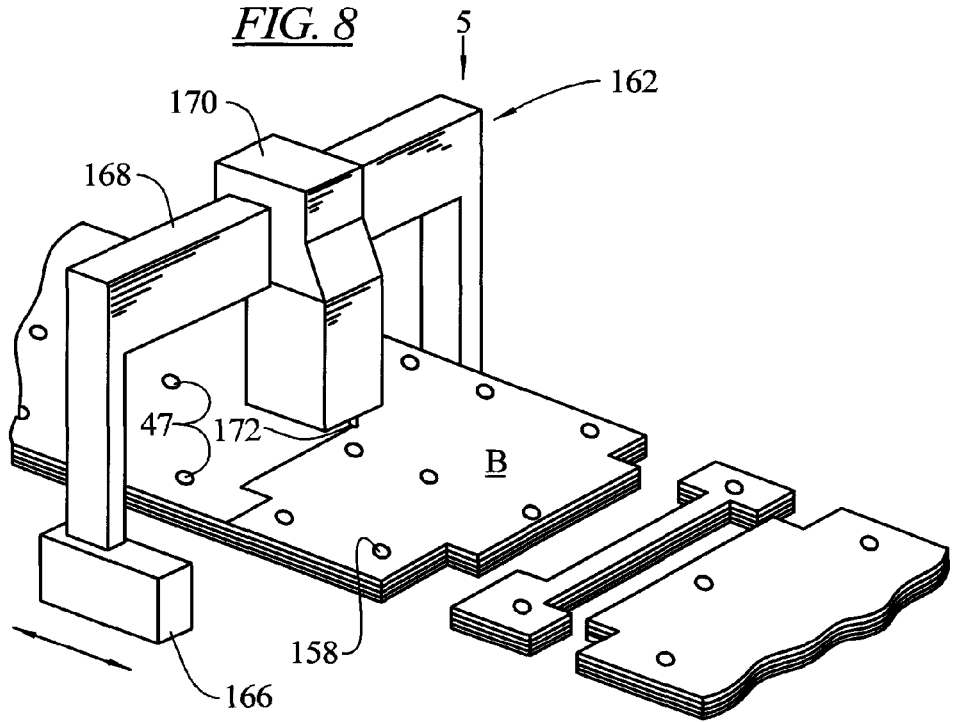
FIG. 8 illustrates a cutting stage.

Referring to FIG. 8, the basted webs are illustrated as having moved into the near net or net pattern cutting stage 5 where they are cut into basted multilayer mats or blanks B. The cutting stage 5 may comprise a gantry 162 including a transverse member 168 which is mounted for movement longitudinally of the webs on a member 166 which is supported by a table 164 (FIG. 3). A member 170 is movable transversely on the member 168 and comprises a device for cutting the multilayer webs into the desired shapes. The gantry 162 and the device 170 therefore constitute an X-Y pattern cutter which is effective to cut the desired shapes for the mats or blanks B by way of a cutter 172 which may be constituted, for example, by a knife or a laser beam. As mentioned above, the basting head may be mounted on the gantry 162 and periodically operated to baste the webs together. As indicated above, the driving structures for the elements 148-156 of FIGS. 5 and 164-170 of FIG. 8 may be electric motors with rack and pinion output structures or any other suitable devices for providing X, Y, Z or, respectively, X-Y movements.

Figure 9:
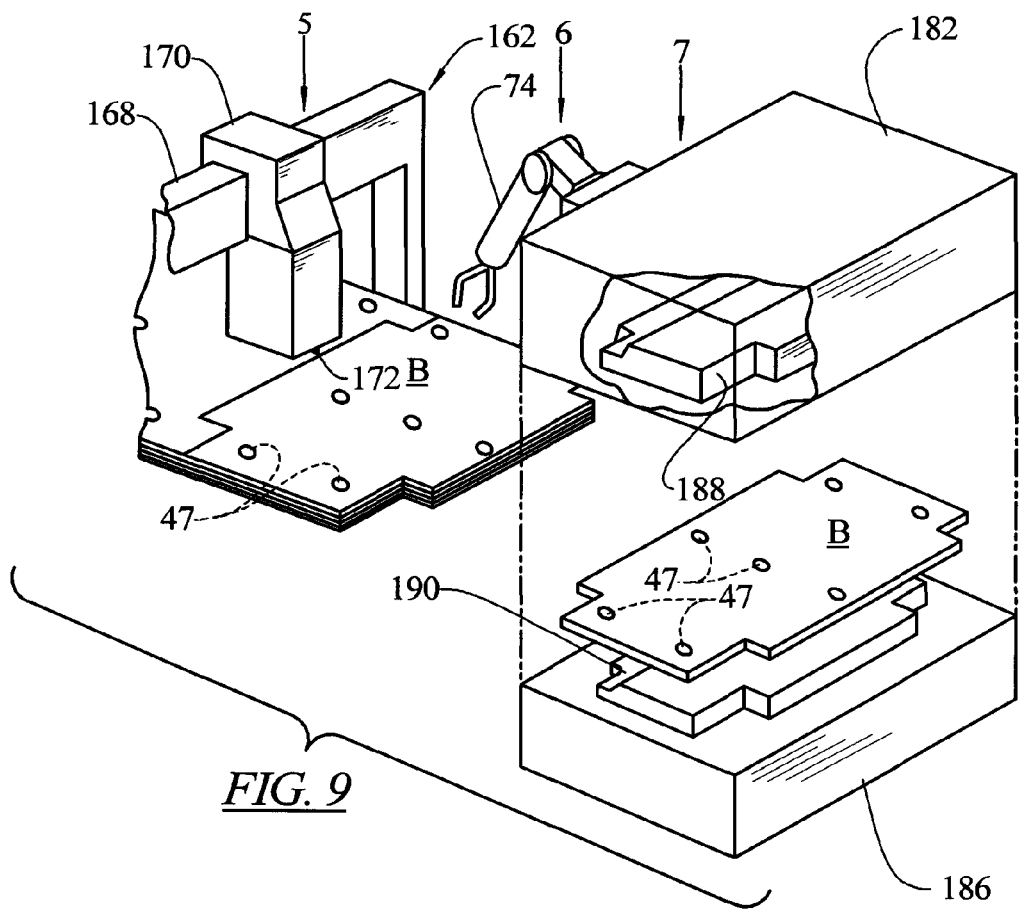
FIG. 9 illustrates the placing of a cut blank into a shaping mold.

The cut blanks B are removed from the cutting stage 5 by the material pick up apparatus 74 of the material handling stage 6 and positioned in the mold stage 7. This is shown in greater detail in FIG. 9 in which a cut blank B has been positioned over a lower shaping mold 186 which includes a male mold plug 190 and which is below and in registry with an upper shaping mold 182 which includes a female mold cavity 188 generally conforming to the shape of the male mold plug 190. Alternatively, the male mold plug may be part of the upper shaping mold and the female mold cavity may be part of the lower shaping mold. As shown, another blank B is being cut at the cutting station 5 and the robot 74 has returned to handle that next blank B.

Figure 10:
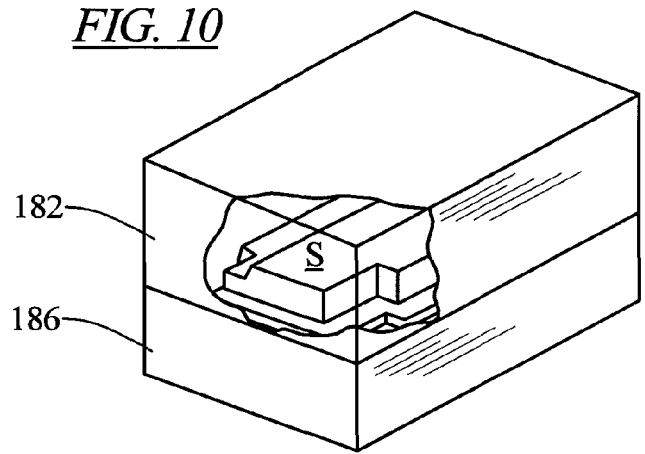
FIG. 10 illustrates a blank inside a closed mold.

The mold is then closed by operating the ram 184 to lower the crossbar 180 and the upper mold 182 to mate the upper and lower shaping mold parts, as shown in FIG. 10, so that the blank B now assumes the character of a three-dimensional shaped element S which conforms to the desired shape of the rigid three-dimensional preform.

Figure 11:
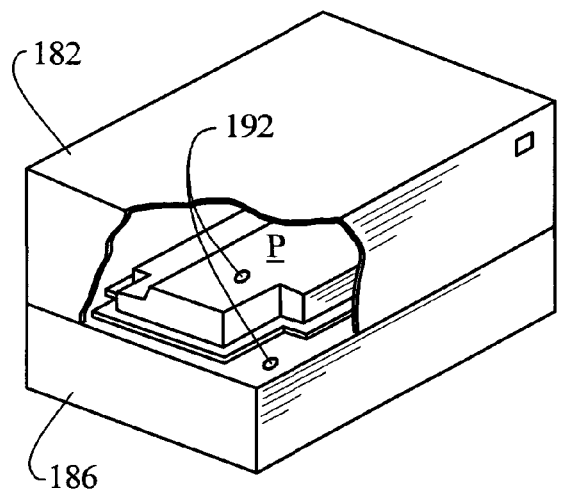
FIG. 11 illustrates a shaped element subjected to electromagnetic radiation promoting the curing of electromagnetic radiation-curable binders, and optionally to an atmosphere promoting the curing of anaerobic binders, and optionally to heat.

While the mold is closed, and as specifically illustrated in FIG. 11, the shaped element S is subjected to electromagnetic energy promoting the curing of electromagnetic energy-curable binders, for instance by one or more LED's and/or quantum dots 192. If a two-stage binder is used with an electromagnetic energy-curing component and an anaerobic component, the shaped element S may also be subjected to an atmosphere that promotes the curing of anaerobic binders. After curing, the molded element is a rigid three-dimensional preform P which may be moved from the mold stage 7 and deposited on the conveyor 10 to transport the same for storage or for use in a further molding process as set forth above.

Figure 12:
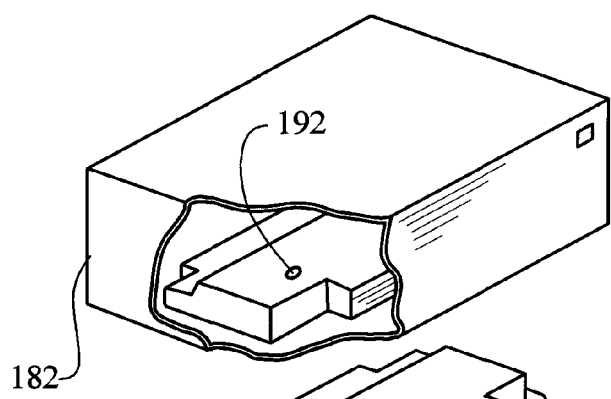
FIG. 12 illustrates the preform ready to be removed from the mold.

Referring to FIGS. 3 and 12, in order to remove the preform P, the ram 184 is operated to raise the crossbar 180 and the upper mold 182 to separate the mold 182 from the mold 186. The robot 94 may then pick up the preform P, as illustrated in FIG. 12, to move the preform P either to the conveyor 10 or to the energetic stitching station 9.

Figure 13:
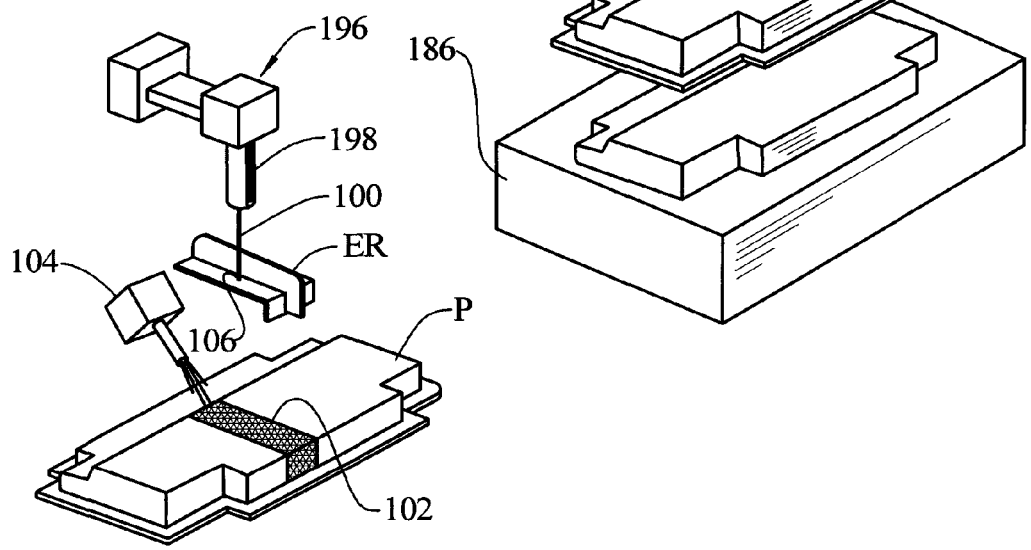
FIG. 13 illustrates an energetic stitching procedure.

Assuming that the preform P is now considered to have the status of a carrier preform, the preform P is moved to the energetic stitching stage 9 (FIG. 3). At this station, the robot 94 of the material handling stage 8 may place the preform P in the position illustrated in FIG. 13. While in this position, a robot 105 manipulates a binder applicator 104 to apply a binder on an area 102 at a location at which an external reinforcement rib ER is to be attached and/or on the matching surface of the reinforcement rib. Alternatively, the binder on area 102 may be instead binder left uncured in the curing stage of FIG. 11. Then, a robot 128 (FIG. 3) or another suitable manipulator orients the member ER into position transversely of the preform P and into intimate contact with the preform. Then, a robot 196 positions an appropriate stitching device into place which in FIG. 13 is represented by 198 for applying the appropriate curing method, for instance an ultraviolet beam 100 produced by one or more ultraviolet LED's, and to direct the same onto an area 106 or, preferably, a plurality of such areas along the rib ER, to cure the binder thereat and stitch the rib ER to the preform P.

Figure 14:
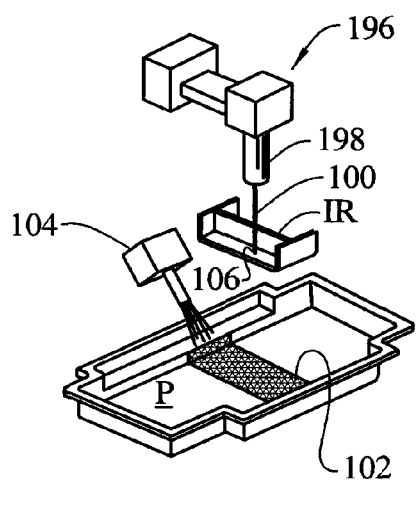
FIG. 14 illustrates an energetic stitching procedure.

The robot 94 may then rotate the preform P 180° and the same steps then performed for an internal reinforcement rib IR to stitch the same with the cavity of the carrier preform P. As shown in FIG. 14, this is an almost identical operation to that shown in FIG. 13 for the external rib ER. The robot gantry 196 may be moved, in either case, to scan along the length of the rib and stitch the respective rib to the carrier preform at a plurality of the locations 106. The stitching may be performed with electromagnetic energy produced by one or more electroluminescent devices such as LED's.

Figure 15:
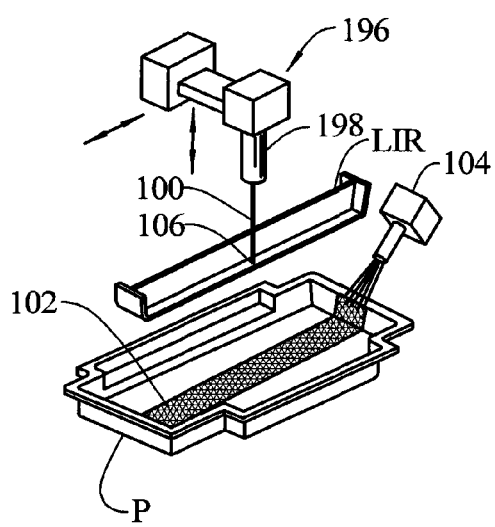
FIG. 15 illustrates an energetic stitching procedure.

Alternatively or in addition to the internal rib IR being applied, the robot 105 may manipulate the binder applicator 104 to spray an elongate area along the inner surface of the carrier preform P and/or a matching surface of the internal rib IR. In this case, as shown in FIG. 15, the robot 128 or similar manipulator picks up and moves an appropriate shaped elongate internal reinforcement member LIR into intimate contact with the preform P at the sprayed area and for example ultraviolet beam 100 produced for example by one or more ultraviolet LED's scans that area or a plurality of locations 106 thereof for stitching the member LIR to the interior of the carrier preform P.

Figure 16:
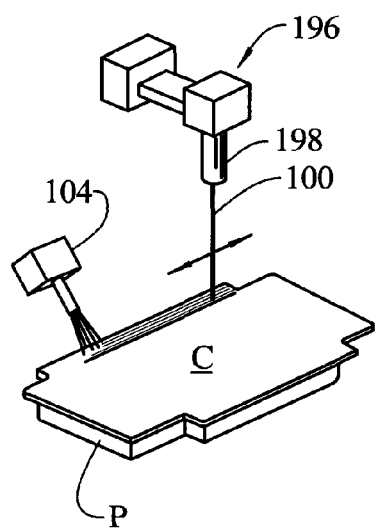
FIG. 16 illustrates an energetic stitching procedure.

Sometimes it is desirable to close the hollow structure of the preform or of the carrier preform P including any core material therein to block filling with resin during the following molding process alternately a sandwich structure can be preformed by including a core material such a balsa, foam or honeycomb between two or more layers of reinforcing materials in order to yield a strong light weight composite part. Sandwich structures are well known in the composites industry. In this case, and as shown in FIGS. 3 and 16, the robot 128 or similar manipulator picks up a cover C and positions the same in registry with the preform P. The robot 94 and possibly additional robots may then grasp and position a portion of the edges of the assembly, after spraying the marginal edge or flange of the preform P and/or of the cover C with binder. The carrier preform has now been stitched closed and may include core material and/or one or more internal reinforcement ribs of the type illustrated in FIGS. 14 and 15. In addition, it may include or be manipulated and stitched to include one or more external ribs ER of the type illustrated in FIG. 13.

FIG. 16 illustrates a similar cover stitching procedure in which the binder spray 104 is manipulated to spray binder resin along the marginal edge or flange of the preform P and/or a cover C and the cover C is manipulated into proper position and the two elements are stitched together with a stitching head 198, wherein said stitching head may comprise one or more electroluminescent devices such as LED's or quantum dots, which is positional by way of the gantry 196 to stitch around the entire periphery of the assembly.

As mentioned above, the basting and stitching procedures, in fact all such attachment procedures, may be carried out via electroluminescent electromagnetic energy sources such as LED's.

In summary, the present embodiments of the invention provide a process for making rigid three-dimensional preforms using reinforcement materials such as fiber webs coated with a binder resin. The webs are drawn from respective rolls of reinforcement material and superposed and directed such that they travel toward a common location at which they are guided so as to travel parallel with respect to one another. Before becoming parallel, the superposed webs have a binder resin of electromagnetic energy-curable material applied, to at least one surface of each pair of facing surfaces and, after becoming parallel, are pressed together to distribute the binder resin and increase the contact area thereof with the fibers of the reinforcement material. Alternatively, a two stage binder containing an electromagnetic energy-curable component and a second and/or third component can be applied. The electromagnetic energy-curable binder component cures upon application of the appropriate electromagnetic energy, for instance via one or more LED's, and the other component(s) cure in response to the application of the appropriate energy. After being pressed together, the webs may also travel to a basting station.

Next, the basted web is cut into shapes each corresponding to a two-dimensional planar development of the three-dimensional shape of the desired rigid three-dimensional preform. The cut material is then transferred to a preform mold where it is formed into the three-dimensional shape of the preform between complementary-shaped upper and lower molds. The molds are constructed so as to be amenable to the application of electromagnetic energy by electroluminescent devices such as LED's or quantum dots, for instance by featuring LED's embedded in the surface of the molds, and are operable therewith to cause the curing of the electromagnetic energy-curable binder and to cause the cut material to become rigid, thus resulting in the desired three-dimensional preform.

At this time, the preform may be utilized in a further molding process or may be considered as a carrier preform to which a subassembly or subassemblies (reinforcement elements and/or mounting members) are stitched by applying a binder to a selected location or locations, moving the subassembly into intimate contact with the preform at those selected locations on the preform and/or on the subassembly and applying the selected method to cure the binder and attach the reinforcement member. These last steps may be multiplied or repeated to attach a plurality of subassemblies including a cover member which closes the hollow shape of the preform to hold a core therein. After all of the reinforcement and/or mounting members are attached, the resulting preform may be transferred to a further molding process.

In additional embodiments, the present teachings may also be applied to two-stage curing methods for making mats such as those developed in U.S. Pat. Nos. 5,217,654 and 5,382,148, whereby fiber mats are made for subsequent use in preforming for a liquid composites RTM or SRIM molding process. According to the present teachings, a two-stage binder comprising a first electromagnetic energy-curable component that cures when exposed to electromagnetic energy of a first set of one or more wavelengths and a second electromagnetic energy-curable component that cures when exposed to electromagnetic energy of a second set of one or more wavelengths, or a two-stage binder comprising an electromagnetic energy-curable component and an anaerobic component, or a two-stage binder comprising a thermal-curing component and an anaerobic component, or a two-stage binder comprising an electromagnetic energy-curable component and a thermal-curing component, are applied to the mat. In the first stage, a partial cure is provided by electromagnetic energy of said first set of one or more wavelengths for curing the first electromagnetic energy-curable component, for instance via one or more LED's producing electromagnetic energy of said first set of one or more wavelengths, or the application of heat for curing of the thermal binder via one or more heat-producing LED's, leading to a predictable and finite increase in viscosity to that of a semi-solid so that the fibers are sufficiently bound for subsequent handling, but not sufficient to complete a cure, while leaving a second stage ready for a final cure which is achieved by the use of electromagnetic energy of said second set of one or more wavelengths for curing the second electromagnetic energy-curable component, for instance via one or more LED's that produce electromagnetic radiation of said second set of one or more wavelengths, or the use of an atmosphere promoting the curing of the anaerobic binder. Prior to the second curing stage, the mat is formed into a three-dimensional shape of a desired preform. The second curing stage then takes place to obtain a rigid three-dimensional preform structure.

Typical binder to fiber material ratios will be on the order of 1% by weight to 12% by weight of the fiber material and it is preferred that the binder ratio will be in the range of 2% to 8% range. The two-stage binders are unique in that they will contain two separate reaction components that will function independently via different methods of initiation and using different mechanisms for initiating the reaction of each component. When using electroluminescent devices such as LED's or quantum dots, the narrow emission spectrum of such devices allows for the use of two-stage binders comprising a first component that cures when exposed to electromagnetic energy of a first set of one or more wavelengths and a second component that cures when exposed to electromagnetic energy of a second set of one or more wavelengths, with no degree of accidental curing from undesirable energy emissions such as those of conventional electromagnetic energy sources such as light bulbs.

The first stage component includes for instance a thermal free radical generator of the type responsive to the heat generated by microwave energy or a thermal source such as infrared rays or hot air convection, such as Lupersol 256, Benzyl Peroxide, Tertiary Butyl Peroctoate and Tertiary Butyl Perbenzoate, or to visible light, such as Irgacure 651, Irgacure 184 or Irgacure 907, or to ultraviolet light, such as Irgacure 261, Cyracure UVE 6990 and Cyracure UVE 6974. The Irgacure products are produced by Ciba Geigy Corp. of Greensborough, N.C. and Hawthorne N.Y. and the Cyracure products are produced by American Cyanamid Corporation, Wayne, N.J. The amount and selection of the first stage initiator in combination with the type of binder resins will determine the first stage of viscosity after exposure to the appropriate energy.

It is therefore readily apparent that the first stage which is responsive to provide a partial cure is responsive to the appropriate energy and the remainder of the binder is uncured until such time that the same is used in making a preform and may be cured with a second appropriate energy or anaerobically.

The ratio of first-stage photoinitiator to the binder resin and exposure to the appropriate energy will determine the viscosity of the resulting partially-polymerized binder. The viscosity at the completion of the first stage reaction should be such that, when staged in this manner, the binder will have the viscosity raised to a point where it will hold the glass fibers together for handling, preferably tack-free, during subsequent processing. The binder will be plastic, deformable and not yet rigid enough to hold the three-dimensional shapes of preforms. In other words, it will be pliable for preforming and the following second stage cure. During the preforming process and the interstices of the glass fibers are obviously not filled at this time as they will be later during the final molding process.

The second stage component of the binder generally includes one or more resins, one or more monomers, one or more hydroperoxides, one or more initiators and one or more inhibitors. An example second stage binder component includes 15% to 55% by weight of a resin such as epoxymethacrylate and 45% to 85% by weight of monomers such as methacrylate monomers, polyhydric alcohols and ester alcohols. From 0% to 30% of the monomers are made up of combinations of one or more of the following depending on performance and compatibility requirements: alkyl hydroxyls (mono, di and tri functional), beta carboxy ethyl acrylate, methacrylic acid, acrylic acid (dimer, trimer and higher analogs), hydroxy ethyl methacrylate, hydroxy propyl methacrylate, hydroxy ethyl acrylate, hydroxy propyl acrylate and hydroxy butyl acrylate. The hydroxyl functionality provides residual functionality for compatibility with epoxies, vinyl esters and urethanes while the acid groups provide residual functionality for epoxies, polyesters and phenolics.

The hydroperoxides may constitute 0% to 5% of the total weight of the composition. The accelerators may constitute 0% to 4% by weight of the composition, and the inhibitors 0% to 0.1% by weight of the composition.

The present process will permit the use of single end roving, such as PPG No. 2002, OCF 366, 107B or 30, or Certainteed 625 or 670. This will provide a variety of yields with the yield selected in accordance with the binder resin makeup.

The two-stage binder also eliminates the need for two separate applications of different binders when preforming using ultraviolet-cured binders for preforms as in the aforementioned COMPFORM® processes. Current technology dictates that mat-type products are purchased with conventional binders applied thereto when they are produced. Conventional binders require modification with heat during preforming or their resilience must be overcome during preforming. New two-stage binders, according to the present invention, eliminate these problems by using a single binder resin with two distinct and different photoinitiators systems that work when exposed to electromagnetic energy of different wavelengths. When used in making mats or performable mats, the first stage takes the place of the first binder as applied by the reinforcement manufacturer, i.e. the glass fiber manufacturer, and the second stage takes the place of the second binder applied by the preform manufacturer for use in preforming.

Because the first stage photoinitiator partially reacts the binder, the second stage cure requires less cross linking to obtain a final cure. This will speed up the second stage cure over what it would have been if there was no first stage cure. It should be understood that the free radicals generated in the first stage curing cause limited cross linking in the binder until there are no further free radicals being generated to advance the cure.

Since the binders are liquid, they do not need to be carried in water to be sprayed. Residual moisture in the reinforcing fibers has long been proven as a cause for reduction of physical and electrical properties with some matrix resins. Because there is no water in the system, there is no required drying and the just-mentioned problem is overcome. Curing by the appropriate electromagnetic energy and optionally by heat and/or anaerobic curing provides the necessary stiffness and material handling characteristics.

For simplicity, the following description is primarily concerned with nonwoven mats, since any process benefits are also applicable to any woven reinforcements where binders are used. Fiber mats come in two general categories, discontinuous fibers called chopped strand mat and continuous fibers generally called continuous strand mat. The present invention applies to both styles of mats or combinations thereof. There are many styles to each of these types of mats.

In the process of the present invention, the fiber mats are prepared by the manufacturer, i.e. as a layer of fibers deposited on a moving web, as disclosed in U.S. Pat. No. 4,054,713 (incorporated herein by reference) and in accordance with the present invention using electroluminescent electromagnetic energy sources such as LED's. The mats are prepared on a continuous web or belt and, upon completion of the layer formation, a binder is applied, typically by spraying, or it can be calendared. The binder is generally applied in a range of 1%-12% by weight of the fiber, typically and preferably in the range of 2.0-8.0 weight percent. After application of the binder, a residence time to allow some wetting of the fibers can be provided by a transport distance to the compression and curing section of the production line as in my U.S. Pat. No. 5,169,571 (incorporated herein by reference).

The mats may also be manufactured with a veil, wherein a veil is a fiber mat that has the purpose to create a resin rich surface, for instance to improve properties such as corrosion resistance and appearance. In some embodiments of the invention, the veil is laid down using a roving that is specially produced for this purpose. The veil may be on either side or on both sides of a mat, depending on which side of the preform the veil is needed on.

The intent of the present concept is to provide new methods to make mat-type products that will then be used in the manufacture of preforms which as is well known in the art, are then used in the manufacture of impregnated finished articles such as bumper beams, sinks and the like. It is to be understood that preforms are three-dimensional products which are used as a basis for making, and as a backbone for making a conforming three-dimensional finished RIM, RTM, SRIM, or similar molded product.

It is usually desirable to compress the layers to achieve the desired density/thickness ratio. In the process of the present invention, as disclosed in U.S. Pat. No. 5,169,571 (herein incorporated by reference) the layers are compressed in stages and held in compression during staged curing. There are several techniques available for achieving the desired density/thickness ratio by compression using rollers or continuous belts or combinations thereof as disclosed in the aforementioned applications.

When using visible light as the curing energy, light can be applied in several different ways: through a web or continuous belt; between rollers over the belt or web, through the rollers; and through the openings between rollers. When the light source is to be contained in the rollers and the light transmitted through the rollers, the rollers can be made of porous metal screen that will allow light transmission or that they can be made of a light-transparent material, such as a light-transparent acrylic or of a light-transparent glass or quartz. When the light source is one or more LED's, said LED's may be embedded in said rollers, belt or web. The belt or web can be made of a porous flexible metal screen that will permit light transmission or it can be made of a light transparent polymer belt or web, such as light-transparent polyethylene, light-transparent acrylic or light-transparent polyvinylchloride. Transparency is relative to the portion of the spectrum in which one is operating. As in the aforementioned U.S. Pat. No. 5,169,571, a light-transparent film can be employed as the web which would also act to keep the uncured binders from the surfaces of the rollers or belts, if desired. It would also keep the potentially-abrasive glass materials from wearing out the surfaces of the transport system. If desired, the light-transparent film can be left with the product as a layer separator in the rolls. A further use of this film then can be as a vacuum seal if desired in subsequent cutting or forming applications prior to the second stage curing and such as in my aforementioned previous patent. The film may also be gas-permeable, in order to allow anaerobic curing if desired.

The process is applicable to the utilization of different forms of energy, and especially electromagnetic energy produced by electroluminescent devices such as LED's. Therefore, a detailed description of the use of appropriate energy systems will be provided hereinbelow.

Figure 17:
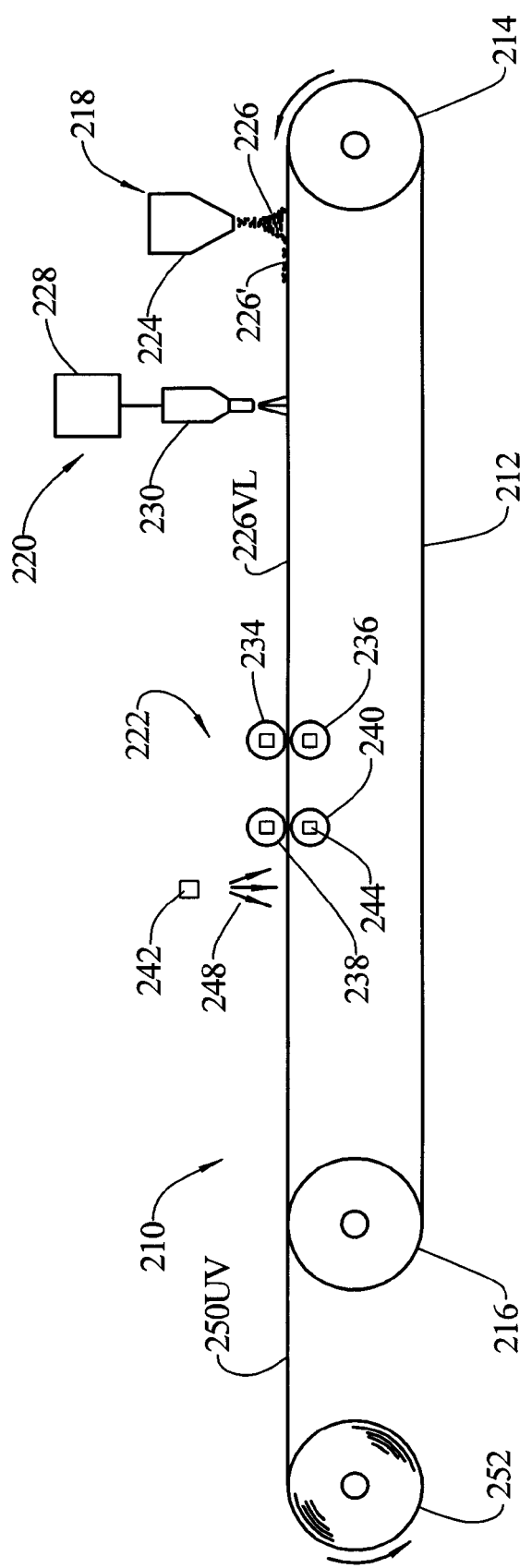
FIG. 17 illustrates a mat forming system including two stage binder with $1^{st}$ stage cure.

Referring to FIG. 17, a mat forming system is generally illustrated at 210 as comprising a plurality of stages spaced along a conveyor belt 212 which is supported for travel along a defined path by a pair of end rollers 214 and 216. The system includes a fiber preparation and application stage 218, a binder applicator 220 and a compression and curing stage 222. At the terminus of the conveyor belt 212, adjacent the roller 216, the formed mat is taken off and rolled up on a take-up or winding roller 252.

At the applicator stage 218, reinforcement fibers, for example either continuous strand or chopped fibers, are prepared in a manner known in the art, such as disclosed in the aforementioned U.S. Pat. No. 4,054,713 (incorporated herein by reference). The reinforcement fibers may also be variable mixes of continuous strand and chopped fibers. The fibers are prepared in the apparatus 224 and deposited, symbolically indicted by the arrow 226, onto the upper surface of the conveyor belt 212 as a layer 226' of fibers. The layer 226' of fibers is then received at the binder applicator station 220 in which binder is drawn from a supply 228, here a two-stage binder, and applied by way of an applicator 230 onto the upper surface of the formed layer 226' to form a binder-coated layer $226_{VL}$ on the upper surface of the conveyor belt 212 with a 1.0-12.0 weight percent of binder, preferably 2.0-8.0 percent weight with respect to the glass fiber or other reinforcement material.

The binder-coated layer $226_{VL}$ then passes into the compression and curing stage 222 in which the conveyor belt 212, more particularly the layer $226_{VL}$ carried thereon is compressed between pairs of spaced compression rollers 234, 236, 238 and 240 where the layer $226_{VL}$ is compressed to a desired density/thickness ratio by the rollers, in stages, and the first component of the binder is cured, in stages, by way of the spaced LED's and/or quantum dots 242 which provide the appropriate energy for curing said component, for instance visible light, ultraviolet light, infrared light or heat. Such LED's and/or quantum dots may extend transversely of the layer $226_{VL}$ and radiate energy as indicated at 246, 248. The LED's and/or quantum dots may also be embedded, for instance, as electromagnetic energy sources 244 in the compression rollers 234, 236, 238 and 240.

After compression and curing, the finished fiber mat, now referenced $250_{UV}$ is taken from the conveyor belt 212 and may be rolled up on the wind-up roller 252. Alternatively, the mat may be fed directly to the cutting machinery or directly to the preforming equipment. If rolled, the mat may then be fed on demand to the cutting machinery or directly to the preforming equipment.

Alternatively, a mold portion can be mounted on the belt system, and a fiber mat directly formed on the mold portion. This is achieved by applying the fibers and the binder directly to the mold portion, followed by the curing of the binder which may take place in one or more stages. When desired and when the preform requirements allow it, the binder can be cured in one step during the deposition of the fibers by applying the appropriate energy. This does not allow the consolidation step but some applications do not require the preform to be consolidated. This also allows the directed fibers to be sprayed directly in a molding tool with or without a gelcoat or with or without a skin material, using a high viscosity version of the binder where the viscosity and "tacky" nature of the binder acts first to hold the reinforcement in place without vacuum and secondarily to secure the reinforcement with curing of the binder with exposure to electromagnetic energy for curing, wherein said electromagnetic energy may be produced by electroluminescent devices such as one or more LED's.

Figure 22:
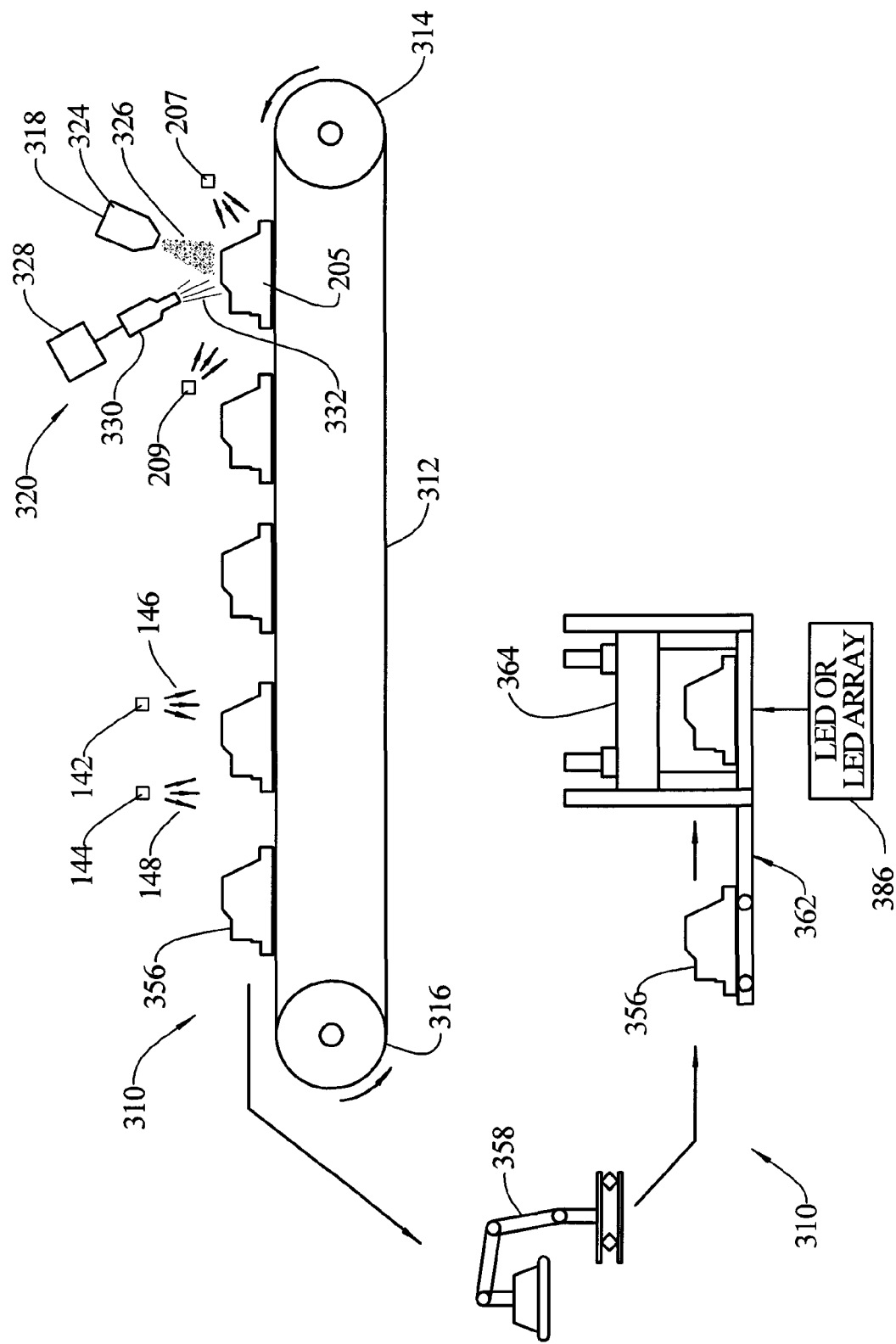
FIG. 22 illustrates a process and apparatus for depositing fibers and binder directly on a mold portion.

Referring to FIG. 22, a fiber and binder application with a first stabilization system is generally illustrated at 310 as comprising a plurality of stages spaced along a conveyor belt 312 which is supported for travel along a defined path by a pair of end rollers 314 and 316. The system includes a fiber application device 318, a binder applicator 330. At the terminus of the conveyor belt 312, adjacent the roller 316, the form is taken off and moved to the consolidation station 210 by robot 358.

At the applicator stage 318, reinforcement fibers are deposited by the apparatus 324 as symbolically indicated by the arrow 326, onto the surface of a mold portion 205. A binder composition, here a two-stage binder composition comprising a first component that cures when exposed to a first appropriate type of electromagnetic energy and a second component that cures when exposed to a second appropriate type of electromagnetic energy, is drawn from a supply 328 and is applied by way of an applicator 330 as binder 332 together with the fibers, to form a binder-coated layer on the surface of the mold portion 205. Optionally, the binder and the fibers may be applied together by way of a combined binder and fibers applicator device. The first stage component of the binder is cured with the first appropriate type of electromagnetic energy applied for instance by LED's or LED arrays 207 and 209. In alternative embodiments, a veil may be added to either side or both sides of the reinforcement fibers, depending on which side of the preform the veil is needed on.

Alternatively, the fiber and binder-coated mold portion 205 passes into the first stabilization system 322 in which the appropriate one or more sources of electromagnetic energy, for instance LED's or LED arrays 142 and 144 extend transversely of the conveyor belt and radiate the first appropriate type of electromagnetic energy as indicated at 146, 148.

After curing, the partially-cured preform on the mold portion, now referenced 356 is taken by robot 358 from the conveyor belt 312 and fed to the consolidation station 210. The consolidation station comprises a consolidation stage wherein the second component of the binder is cured, in the form of a forming press 364 with counter mold, as in FIG. 22, and partially-cured preform 356 is moved along a shuttle 362 to the forming press 364 where the two halves of the press are pressed together to replicate the desired shape of the preform and a second electromagnetic energy appropriate to cure the second component of the binder is applied by LED or LED array 386. Alternatively, the consolidation stage may be a film or flexible tooling that is placed on the tool surface and a second electromagnetic energy appropriate to cure the second component of the binder is applied. The second electromagnetic energy may be optionally applied in such a fashion as to completely cure the second component of the binder or not to completely cure the second component of the binder, depending on the application at hand. If desired, reinforcements may be attached to the preform according to the energetic stitching techniques set forth above.

In an alternative embodiment of the invention, the first stage stabilization system can be eliminated and the tool moved directly to the consolidation station.

Figure 18:
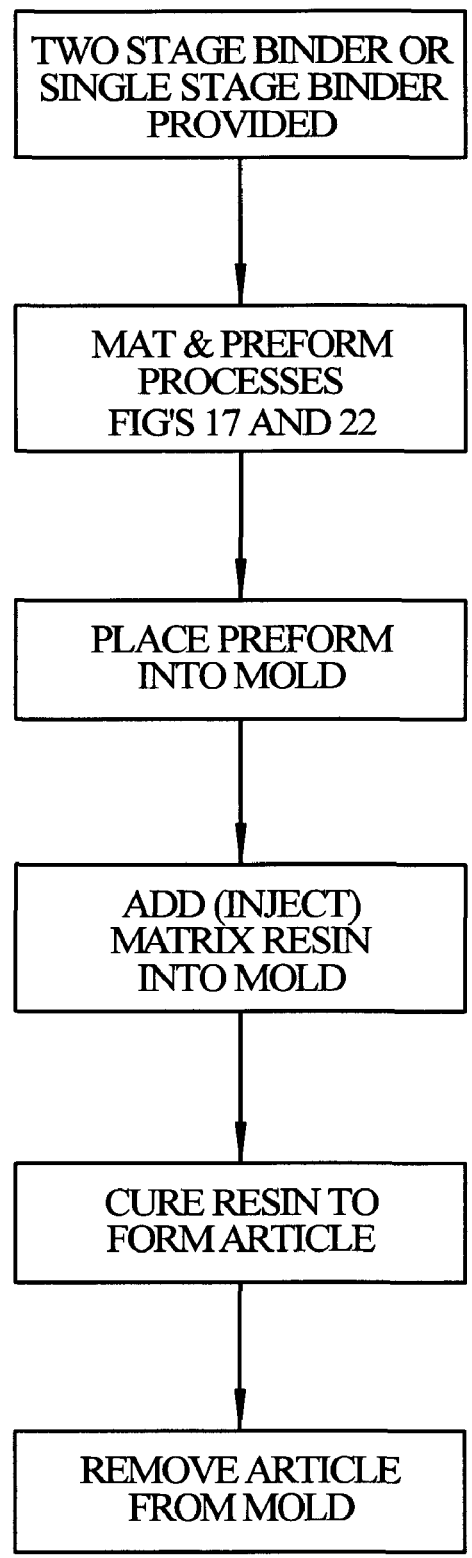
FIG. 18 illustrates the flow chart of a molding process.

Referring to FIG. 18, the entire molding process is generally set forth in flow-chart style in which a two-stage binder is provided to the binder applicator 220 of FIG. 17, and the mat is formed according to FIG. 17 and a preform is formed. The preform is then placed into a mold, in accordance with RIM, RTM and SRIM processes or other such processes that use or require a preform and a deformable plastic material, such as a matrix resin is introduced into the mold, such as by injection or vacuum or other such method, to flow the matrix resin into and fill the interstices of the preform. The matrix resin is then cured in the mold and the product is then removed according to methods known in the art. Alternatively, in the entire molding process, as set forth in the flow chart of FIG. 18, a single-stage or a two-stage binder is provided to the binder applicator, the material is applied directly to a tool as shown in FIG. 22, and a preform is produced either directly using a single-stage binder or using a consolidation process comprising a the use of a two-stage binder as described above. The preform may then be used as described above.

In further embodiments, it is an object of the present invention to provide an improved directed fiber process for making structural preforms with an electromagnetic energy-curable binder. This object is attained by providing a mold which is perforate to support a flow of air therethrough when placed in a plenum, as previously disclosed in U.S. Pat. No. 5,192,387 (herein incorporated by reference). The reinforcement material is drawn from a supply of roving on spools, optionally chopped and flung as would occur by spraying or directing toward the perforate mold part. An electromagnetic energy-curable binder is added to the fibers to at least partially coat the fibers with binder during their travel to the perforate mold part and/or after reaching their destinations at the mold part. The binder is applied to a degree sufficient to coat the fibers, optionally without filling the interstices among said fibers. During the application of the fibers and the binder, the perforate mold part may be rotated so as to obtain complete coverage with the fibers to a desired thickness. In order to enhance and even coverage, the fibers and binder may be directed from the distal end of a robot arm which may be operated in accordance with a program to scan the perforate mold part to ensure coverage at all areas including the inside corners thereof.

After the fibers and binder have been applied to the perforate mold part, if consolidation is required, the mold is closed to press the applied fibrous mat into the desired shape of a preform by pressing a complementary shaped second mold part against the preform. This is usually a low-pressure pressing operation and ensures that the fibers bridging the inside and projecting from outside corners of the shaped fibers are deformed to conform to the shapes of those corners. Alternatively, vacuum may be used to consolidate by applying a flexible cover to seal the tools, instead of the second perforate mold part, to the applied fibers. The flexible cover may be a thin film of a material such as polyethylene, silicon or a soft elastomer and the non perforate tool can be of any reasonably rigid tool material, thermoformed sheet material or the like.

While still in the mold, the preform is subjected to an electromagnetic energy promoting the curing of the binder to cure the binder and rigidize the fibrous mat in the pressed shape. This electromagnetic energy may be produced by one or more electroluminescent devices such as LED's. At this time, the preform may be transferred to a molding process for making a structural composite or it may be considered a carrier preform which is to have reinforcement members or the like attached thereto.

Figure 19:
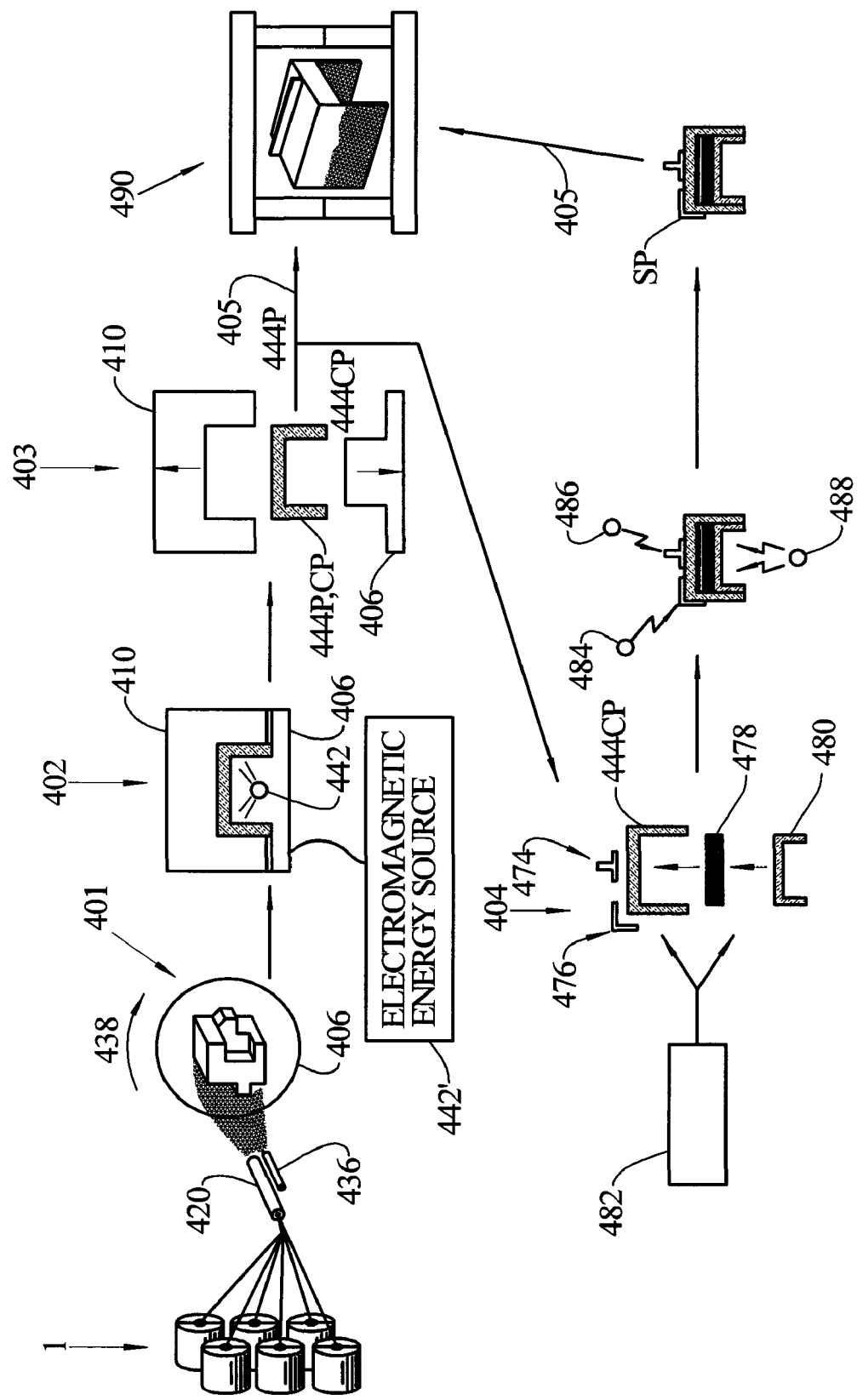
FIG. 19 is a process flow chart for making a structural composite utilizing directed fiber, directed energy techniques.

As shown in FIG. 19, the basic direct fiber preforming process using electroluminescent devices such as LED's is generally illustrated as being performed in 3 or alternatively 4 stages including a fiber and binder deposition stage 401, an electromagnetic energy curing stage 402, a completed preform stage 403, an energetic stitching stage 404, and a supply stage 405. Energetic stitching is application dependant, and may be carried out using binder not cured in energy curing stage 402.

Figure 20:
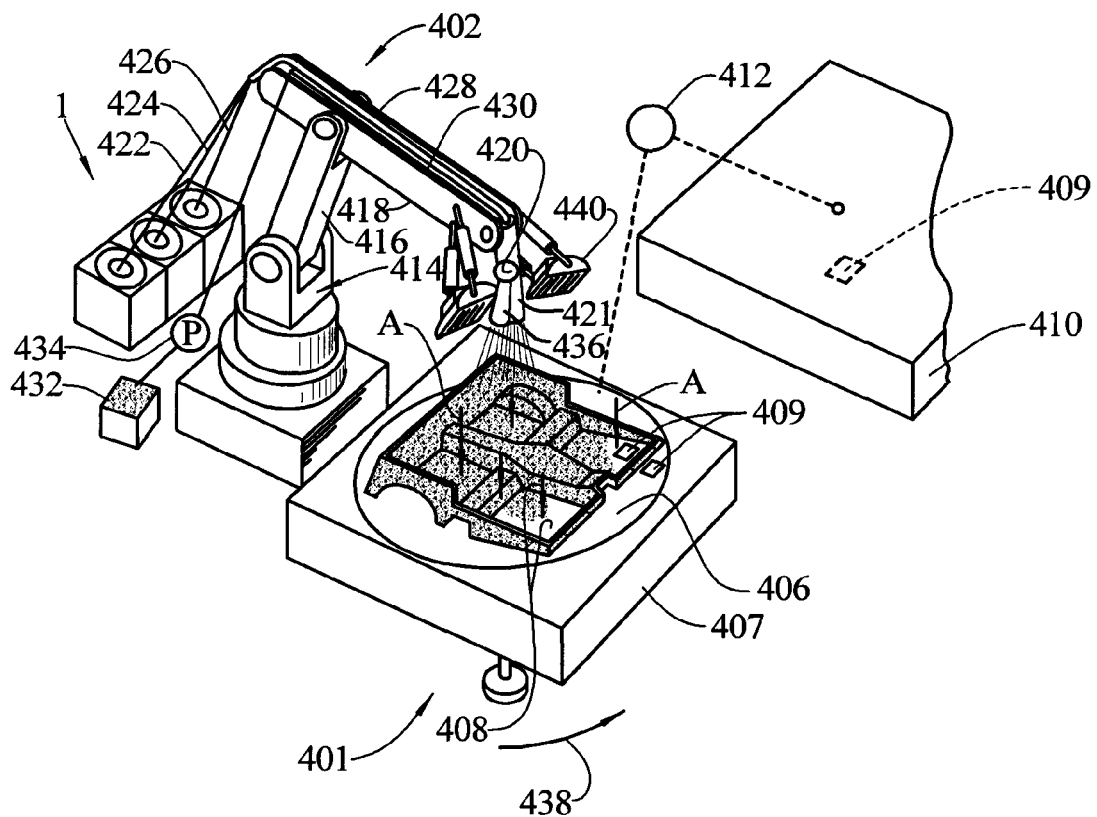
FIG. 20 illustrates an apparatus for manufacturing a preform.

The fiber deposition stage 401 (FIG. 20) comprises a lower, first mold part 406 which is supported for rotation by a plenum 407. The first mold part 406 is a perforate element which will support a flow of air therethrough by way of the plenum 407 to build up a mat on surfaces 408 which are oblique to one another and define inner and outer corners. The mold part 406 is complementary to an upper, second mold part 410 and the two parts have complementary inner surfaces which define a desired three-dimensional shape of a preform for replication of the preform. When consolidation is desired or required, this may be accomplished by applying a closure.

The mold parts 406 and 410 are parts of press mold and are illustrated as being mechanically linked to a mold closing and opening mechanism 412 which may be constituted by a hydraulic ram or rams and appropriate guides and linkages as are well known for press molds. With the mold open, fibers of reinforcement material, such as glass fiber or carbon fiber reinforcement material, and an electromagnetic energy-curable binder resin, are propelled into the air stream (indicated by the arrows A) established through the plenum and the perforate mold part 406 and directed onto the profile shape of the mold part 406. In order to improve coverage, the mold part 406 can be rotated as indicated by the arrow 438 and the fibers and binder are directed, via the air stream, onto the mold part 406 by way of a robot 414 of the applicator stage 402.

The robot 414 is illustrated as comprising a vertical axis and at least two horizontal axes so that the fibers and binder emanating from the distal end of the arm structure 416, 418 may be directed to all parts of the rotatable mold part 406.

The application stage 402 is illustrated as comprising the robot having the arms 416 and 418, a chopper 420 which receives roving 422, 424, 426 from spools of roving at the supply stage 1 via a tube 428 mounted on the arm 418, and a conduit 430 carrying binder 432 supplied by way of a pump 434 to a spray nozzle 436, and an outlet port 421 for the chopped fibers.

The supply stage 1 is illustrated as comprising a plurality of spools of the reinforcement material roving 422, 424 and 426, fed into a tube 428 as well as the supply of binder 432 and the pump 434. The chopper 420 may comprise one or more spinning elements, including gears and knife blades, for drawing and chopping the roving 422, 426 and flinging the chopped fibers towards the perforate mold part 406. Sources of electromagnetic energy can be constituted, for instance, by LED's or LED arrays 409 embedded in surface 408 and/or mold parts 406 and 410. Quantum dots can also provide sources of electromagnetic energy.

In operation, the chopper 420 draws the roving 422-426, chops the same and flings the chopped fibers toward the perforate mold part 406. Contemporaneously, the binder is sprayed from the spray nozzle 436 to at least partially coat the directed fibers on their way to and/or at the perforate mold part 406. As the fibers are directed to the mold part 406, the mold part 406 is rotated, as indicated by the arrow 438, and the robot is operated to scan all of the inner surfaces of the perforate mold part 406 in conjunction with the rotation thereof so that an even deposition of the fibers to a predetermined thickness is obtained over all of the inner surfaces of the mold part 406.

The preform can be cured at this time or alternately. After application of the fibers to the mold part 406, a preform counter mold is closed by the mold operating mechanism 412 to close the mold part 410 onto the mold part 406 and press the fibrous mat to conform to the desired-dimensional shape of the preform. The material of the mold may be transmissive to electromagnetic radiation, such as a wire grid and/or a general purpose clear acrylic material which does not contain light blockers. Additionally, as set forth above, electroluminescent devices such as LED's may be attached to or embedded into the mold surface.

At this point, the preform may be employed for molding a structural composite. As such, the mold is opened and the preform is picked up from the mold by another robot or the like (not shown) similar to the robot 414 and placed on a conveyor 460 of the discharge station 405 for transport to storage or to the further molding process.

If the preform is to assume the character of a carrier preform and is to have a subassembly or subassemblies attached thereto, the robot, or another robot, either holds the preform 444 in a desired position or places the same on a work table in the desired position for the attachment of a reinforcement member at the energetic stitching stage 404. Here, the preform 444 is illustrated as residing on a table in the desired position. With the preform in this position, another robot 454 may be operated to apply an electromagnetic energy-curable binder or a thermally curable binder or an anaerobic binder from a reservoir 452 and via a pump 450 through a dispenser or spray nozzle 448 mounted at the distal end of a robot arm 456 of the robot 454, the binder being applied to at least one selected surface of the preform 444 and/or of the subassembly. Then, a reinforcement insert 446 may be placed, as by another robot, into a desired position and into intimate contact with the preform at the selected area having the binder coating thereon. The robot 454 then positions itself to apply the appropriate energy for curing the binder at the selected area by way of an energy source 458. If the binder is an electromagnetic energy-curable binder, or contains an electromagnetic energy-curable component, the energy source may be one or more electroluminescent devices such as LED's.

The last operation, described above as "energetic stitching", may be accomplished any number of times to apply reinforcement members and/or attachment members (engineered structural members) to the preform prior to its use in making a structural composite. After the last subassembly has been energetically stitched thereto, the preform 444 carrying the additional members is moved by another robot (not shown) to the conveyor 460 of the discharge stage 405.

Through the use of selected binders, the curing thereof may be accomplished by electroluminescent devices such as LED's.

Figure 21:
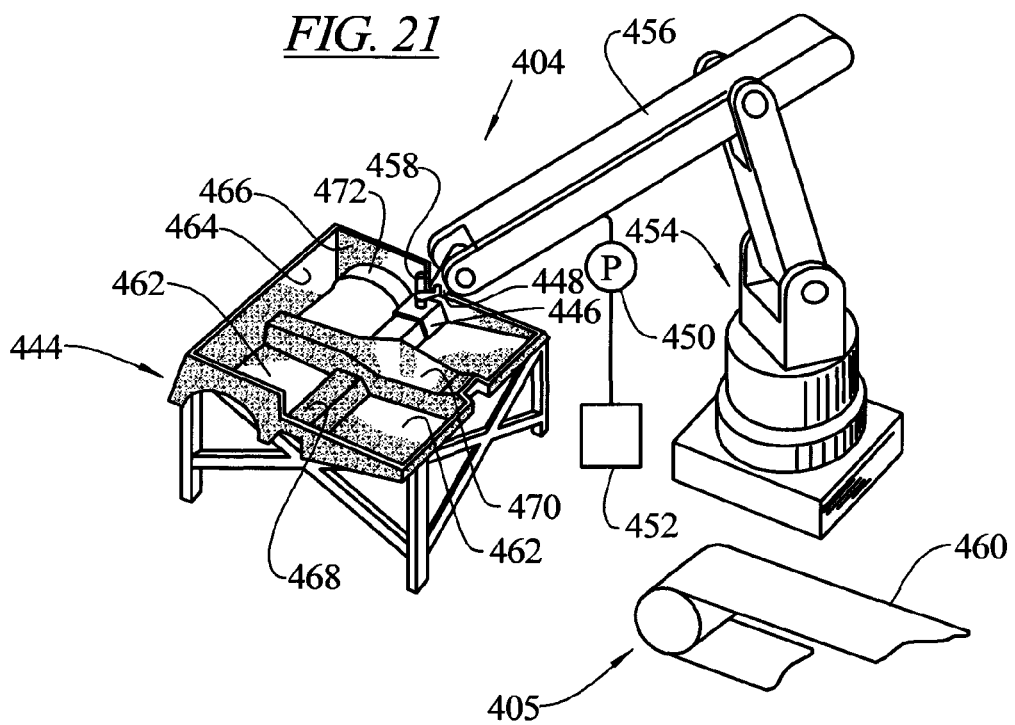
FIG. 21 illustrates an apparatus for energetic stitching onto a preform.

Referring to FIG. 21, the structure and character of a typical preform is illustrated in which the preform 444 comprises a plurality of generally horizontal, or slightly oblique to the horizontal, panels 462 having a plurality of vertical walls 464, 466 extending therefrom along with generally U-shaped profile sections 468, 470, 472. Any other shape can be formed which is consistent with directing the fibers to catching and supporting surfaces which can be defined by inner surfaces, including insert plugs, of the upper and lower mold parts.

Referring to FIG. 19, a process for making a structural composite is illustrated in the form of a flow chart, the process incorporating the directed fiber, directed energy concepts of the present invention. As previously set forth, the roving is drawn from a supply stage 1, chopped with a chopper 420 and directed onto a perforate member having air drawn therethrough via a plenum structure and which is rotatable as indicated by the arrow 438. The chopped fibers directed toward the perforate element are sprayed with a binder emanating from a spray nozzle 436. The rotation of the perforate element and scanning by the chopper 420 and the spray nozzle 436 provides an even coating or mat of binder-coated fibers deposited to a predetermined thickness.

The perforate element is, in the illustrated embodiment, a lower mold part 406 which may have a complementary upper mold part 410 which is moved to close the mold so that the mat of fibers accurately replicates the desired size and shape of the preform. The binder is an electromagnetic energy-curable binder, here cured by the application of electromagnetic radiation that is applied via one or more electroluminescent devices 442', such as LED's, which are illustrated here as being operably connected to the mold. For instance, the mold parts 406 and 410 may be constructed of an electromagnetic radiation-transmissive material, such as grid or a general purpose, clear acrylic material which does not include electromagnetic radiation blockers. Alternatively, the electroluminescent elements such as LED's may be directly embedded in the mold surface. Also, if the binder is thermal binder, heat-generating LED's may be used to promote its curing.

Next, the mold is opened by providing a separation between the mold parts 406 and 410 so that the cured, rigidized three-dimensional preform may be removed. The preform is here referenced 444P, 444CP, in that the preform may now assume the character of a final element 444P for movement by way of the discharge stage 405 to an RTM or SRIM molding process 490, or it may assume the character of a carrier preform 444CP and be moved to an energetic stitching station 404 for the application of subassemblies, such as reinforcement ribs, cores, covers and the like. Station 404 may also be an energetic stitching station.

When the station is an energetic stitching station 404, the carrier preform 444CP may have an external rib 474 (and/or an internal rib), a reinforcement corner 476, a core 478 and a cover 480 connected thereto by the application of an electromagnetic energy-curable binder or a thermally curable binder applied from a source 482 to a selected surface area or surface areas of the carrier preform 44CP and/or the rib 474, the corner 476 and the cover 480. The cover 480 will hold the core 478 within the preform 444CP and the core 478 is not necessarily tacked to the carrier preform. The purpose of the core 478 is to save material in the RTM/SRIM later molding process in which the plastic material could migrate through the hollow, porous wall of the preform into the pocket or cavity which would give rise to an excess use of material, an increased weight and an extension of the curing time for the applied plastic.

After the application of the binder and the subassemblies to the carrier preform 444CP, the binder-coated selected areas are subjected to the energy appropriate for curing the binder, for instance by way of energy sources 484, 486, 488. Such energy sources may be electroluminescent devices, for instance LED's. Finally, the stitching produces a structural preform SP which is then transferred by way of the discharge stage 405 to the RTM/SRIM molding process 490.

Lastly, all of the methods of the present application may also be carried out by means of apparatuses comprising molding and tooling parts that comprise quantum dots. For example, the quantum dots can be directly incorporated in the materials of the molding and tooling parts. Materials incorporating quantum dots are commercially available, for example under the brand name EVICOMPOSITES™ (Evident Technologies, Troy, N.Y.). Alternatively, the quantum dots can be added to the molding and tooling surfaces as components of coating compositions and films.

If the tooling and/or its surface is conductive, the quantum dots can be made to emit electromagnetic energy by passing an electric current therethrough. The quantum dots can also be made to emit electromagnetic energy following excitation by means of electromagnetic energy produced by sources such as traditional incandescent lamps or LED's.

Accordingly, the entire surface of a mold, or a desired part thereof, can be stimulated to emit electromagnetic radiation at the desired frequencies by electroluminescence of the quantum dots in the tooling surface. The electromagnetic radiation emitted by the quantum dots is then used to cure binder compositions.

EXAMPLES (1) Curing Binders Over Fiberglass

The feasibility of curing binders on fiberglass using LED's instead of the lamp systems traditionally used was tested as follows. A binder with an electromagnetic energy-curable binder was first applied to a continuous fiberglass strand mat. The binder comprised an initiator sensitive to electromagnetic radiation of a wavelength of 395 nm. A total of 100 LED's, each emitting at a wavelength of 395 nm and at a power of 30 mw, were set up in array measuring 5.08 cm by 0.95 cm. The array was scanned across the fiberglass strand mat such that the scanning direction coincided with the width of the array. The scanning velocity was at least 1.27 cm/sec and at most 2.54 cm/sec. The binder cured immediately upon scanning, yielding a solidified strand mat.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

The invention claimed is:

1. A method of making a preform using a separable mold including a perforate first mold part and a pressing second mold part, the mold parts, when closed, together defining a desired three-dimensional shape of the preform and including inner surfaces disposed at angles with respect to one another forming inside and outside corners, comprising the steps of:
   (a) cutting fibers of reinforcement material;
   (b) propelling the cut fibers onto a surface of the perforate first mold part while contemporaneously flowing air through the first mold part to direct the fibers onto all surfaces of the first mold part to a predetermined thickness;

(c) applying an electromagnetic energy-curable binder onto the cut fibers to at least partially coat the fibers with the binder, optionally without filling interstices among the fibers;

(d) optionally closing the separable mold parts to press the binder-coated cut fibers into the desired three-dimensional shape of the preform between a surface of the pressing second mold part and the perforate first mold part of the closed mold;

(e) applying electromagnetic energy to the binder that promotes the curing of said binder, wherein said electromagnetic energy is produced by one or more electromagnetic energy production elements, wherein one or more of said electromagnetic energy production elements are located on at least one of the surfaces of the first mold part or the second mold part, and wherein said elements are selected from the group consisting of electroluminescent devices, quantum dots and combinations thereof.

2. The method of claim 1, further comprising the steps of:

(f) applying a heat-curable binder to at least one selected area of the preform;

(g) moving a reinforcement subassembly into intimate contact with the preform at the at least one selected binder-coated area; and (h) applying heat onto the at least one selected binder-coated area to cure the binder and attach the subassembly to the preform, wherein said heat is produced by heat-producing LED's.

3. The method of claim 1, wherein said electroluminescent devices are one or more LED's.

4. The method of claim 1, wherein the separable mold comprises an electromagnetic energy-transmissive material.

5. A method of making a preform using a mold defining a desired three-dimensional shape of the preform and including a perforate mold surface, comprising the steps of:

(a) cutting fibers of reinforcement material;

(b) propelling the cut fibers onto the surface of the mold while contemporaneously flowing air through the mold to direct the fibers onto the surface of the mold;

(c) applying an electromagnetic energy-curable binder onto the cut fibers to at least partially coat the fibers with the binder, optionally without filling interstices among the fibers;

(d) applying electromagnetic energy to the binder that promotes the curing of said binder, wherein said electromagnetic energy is produced by one or more electromagnetic energy production elements, wherein one or more of said electromagnetic energy production elements are located on the surface of the mold, and wherein said elements are selected from the group consisting of electroluminescent devices, quantum dots and combinations thereof.

6. The method of claim 5, further comprising the steps of:

(e) applying a heat-curable binder to at least one selected area of the preform;

(f) moving a reinforcement subassembly into intimate contact with the preform at the at least one selected binder-coated area; and (g) applying heat onto the at least one selected binder-coated area to cure the binder and attach the subassembly to the preform, wherein said heat is produced by heat-producing LED's.

7. The method of claim 5, wherein said electroluminescent devices are one or more LED's.

8. The method of claim 5, wherein at least a portion of the mold comprises an electromagnetic energy-transmissive material.

9. The method of claim 5, wherein said step of propelling the cut fibers onto the surface of the mold continues until the cut fibers have achieved a predetermined thickness over the mold surface.

10. The method of claim 5, wherein said step of propelling the cut fibers onto the surface of the mold occurs at the same time as the step of applying an electromagnetic energy-curable binder onto the cut fibers.

11. The method of claim 5, wherein said step of applying an electromagnetic energy-curable binder onto the cut fibers occurs prior to the step of propelling the cut fibers onto the surface of the mold.

12. A method of making a molded article using a mold defining a desired three-dimensional shape of the molded article and including a perforate mold surface, comprising the steps of:

(a) cutting fibers of reinforcement material;

(b) propelling the cut fibers onto the surface of the mold while contemporaneously flowing air through the mold to direct the fibers onto the surface of the mold;

(c) applying an electromagnetic energy-curable binder onto the fibers to at least partially coat the fibers with the binder;

(d) applying electromagnetic energy to the binder that promotes the curing of said binder, wherein said electromagnetic energy is produced by one or more electromagnetic energy production elements, wherein one or more of said electromagnetic energy production elements are located on the surface of the mold, and wherein said elements are selected from the group consisting of electroluminescent devices, quantum dots and combinations thereof.

13. The method of claim 12, further comprising the steps of:

(e) applying a heat-curable binder to at least one selected area of the molded article;

(f) moving a reinforcement subassembly into intimate contact with the molded article at the at least one selected binder-coated area; and (g) applying heat onto the at least one selected binder-coated area to cure the binder and attach the subassembly to the molded article, wherein said heat is produced by heat-producing LED's.

14. The method of claim 12, wherein said electroluminescent devices are one or more LED's.

15. The method of claim 12, wherein at least a portion of the mold comprises an electromagnetic energy-transmissive material.

16. The method of claim 12, wherein said step of propelling the cut fibers onto the surface of the mold continues until the cut fibers have achieved a predetermined thickness over the mold surface.

17. The method of claim 12, wherein said step of propelling the cut fibers onto the surface of the mold occurs at the same time as the step of applying an electromagnetic energy-curable binder onto the cut fibers.

18. The method of claim 12, wherein said step of applying an electromagnetic energy-curable binder onto the fibers occurs prior to the step of propelling the cut fibers onto the surface of the mold.

* * * * *